(12) United States Patent
Gunji et al.

(10) Patent No.: US 7,079,822 B2
(45) Date of Patent: Jul. 18, 2006

(54) METHOD OF AND APPARATUS FOR MULTI-CHANNEL MANAGEMENT, MULTI-CHANNEL INTERFERENCE MANAGEMENT METHOD, MULTI-CHANNEL TERMINAL, METHOD OF AND APPARATUS FOR MULTI-CHANNEL SETTING, AND COMPUTER PRODUCT

(75) Inventors: Masao Gunji, Kawasaki (JP); Koji Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 589 days.

(21) Appl. No.: 10/029,841

(22) Filed: Dec. 31, 2001

(65) Prior Publication Data

US 2003/0050025 A1    Mar. 13, 2003

(30) Foreign Application Priority Data

Sep. 11, 2001    (JP)    ............................. 2001-275648

(51) Int. Cl.
*H04B 1/18*    (2006.01)
(52) U.S. Cl. .............................. 455/186.1; 455/168.1; 455/296
(58) Field of Classification Search ................ 455/447, 455/450, 464, 509, 296, 185.1, 186.1
See application file for complete search history.

(56) References Cited

U.S. PATENT DOCUMENTS

| | | | | |
|---|---|---|---|---|
| 5,809,119 | A * | 9/1998 | Tonomura et al. ...... | 379/114.05 |
| 6,539,203 | B1 * | 3/2003 | Herrig ......................... | 455/62 |
| 6,587,450 | B1 * | 7/2003 | Pasanen ..................... | 370/338 |
| 6,738,881 | B1 * | 5/2004 | Ollivier et al. ............. | 711/168 |
| 2002/0031224 | A1 * | 3/2002 | Basawapatna et al. ...... | 380/211 |
| 2002/0098846 | A1 * | 7/2002 | Kashiwagi et al. ......... | 455/447 |
| 2002/0098870 | A1 * | 7/2002 | Kashiwagi et al. ......... | 455/561 |
| 2002/0102979 | A1 * | 8/2002 | Curley et al. ............... | 455/450 |
| 2003/0033452 | A1 * | 2/2003 | Himmel et al. ............. | 710/9 |
| 2003/0092424 | A1 * | 5/2003 | Kuo et al. ................... | 455/411 |

FOREIGN PATENT DOCUMENTS

JP    6-19621    1/1994

* cited by examiner

*Primary Examiner*—Nguyen T. Vo
*Assistant Examiner*—Nhan T. Le
(74) *Attorney, Agent, or Firm*—Arent Fox PLLC

(57) ABSTRACT

A multi-channel input system connects between a plurality of terminals and a plurality of radio keyboards corresponding to these terminals by radio links (channels), according to a multi-channel system. A high-order terminal has a CPU that manages a setting status of each channel in this multi-channel input system, by using a channel-setting table, and notifies the setting status to any one of the terminals a according to a request from this terminal.

8 Claims, 15 Drawing Sheets

| CHANNEL | $CH_1$ | $CH_2$ | $CH_3$ | $CH_4$ | $CH_5$ | ... | $CH_n$ |
|---|---|---|---|---|---|---|---|
| TERMINAL ID | $PC_1$ | $PC_2$ | FREE | FREE | $PC_5$ | ... | $PC_n$ |

| TERMINAL ID \ CHANNEL | $CH_1$ | $CH_2$ | $CH_3$ | $CH_4$ | $CH_5$ | ... | $CH_n$ |
|---|---|---|---|---|---|---|---|
| $PC_1$ | SET | ○ | × | × | × | ... | × |
| $PC_2$ | ○ | SET | × | × | × | ... | × |
| $PC_5$ | × | × | × | × | SET | ... | × |
| ⋮ | ⋮ | ⋮ | ⋮ | ⋮ | ⋮ | ... | ⋮ |
| $PC_n$ | × | × | × | × | × | ... | SET |

PLEASE BE CAREFUL THAT WHEN THE CHANNEL IS CHANGED, THERE IS A POSSIBILITY OF THE OCCURRENCE OF INTERFERENCE IN THE FOLLOWING CHANNEL.

THE CHANNEL HAVING THE POSSIBILITY OF INTERFERENCE: CH2

THE CURRENT SET CHANNEL IS CH1.

PLEASE BE CAREFUL THAT WHEN THE CHANNEL IS CHANGED, THERE IS A POSSIBILITY OF THE OCCURRENCE OF INTERFERENCE IN THE FOLLOWING CHANNEL.

THE CHANNEL HAVING THE POSSIBILITY OF INTERFERENCE: CH1

THE CURRENT SET CHANNEL IS CH2.

THE CURRENT CHANNEL IS SET AS BELOW.

| CHANNEL | CH1 | CH2 | CH3 | CH4 | CH5 | ··· | CHn |
|---|---|---|---|---|---|---|---|
| TERMINAL ID | PC1 | PC2 | FREE | FREE | PC5 | ··· | PCn |

THE CHANNEL SETTING HAS BEEN COMPLETED.
THE CHANNEL HAS BEEN SET TO CH2.

AS THERE IS NO FREE CHANNEL AT PRESENT,
IT IS NOT POSSIBLE TO SET A CHANNEL.

| CHANNEL | $CH_1$ | $CH_2$ | $CH_3$ | $CH_4$ | $CH_5$ | ... | $CH_n$ |
|---|---|---|---|---|---|---|---|
| TERMINAL ID | $PC_1$ | FREE | $PC_3$ | $PC_4$ | $PC_5$ | ... | $PC_n$ |

110

| CHANNEL | $CH_1$ | $CH_2$ | $CH_3$ | $CH_4$ | $CH_5$ | ... | $CH_n$ |
|---|---|---|---|---|---|---|---|
| TERMINAL ID | $PC_1$ | $PC_2$ | $PC_3$ | $PC_4$ | $PC_5$ | ... | $PC_n$ |

110

METHOD OF AND APPARATUS FOR MULTI-CHANNEL MANAGEMENT, MULTI-CHANNEL INTERFERENCE MANAGEMENT METHOD, MULTI-CHANNEL TERMINAL, METHOD OF AND APPARATUS FOR MULTI-CHANNEL SETTING, AND COMPUTER PRODUCT

FIELD OF THE INVENTION

The present invention relates to a technology suitable for application to a multi-channel input system for making cordless connection between a plurality of terminals and a plurality of input apparatuses corresponding to these terminals based on a multi-channel system. This invention particularly relates to a technology for preventing interference in multi-channel communications and carrying out a channel setting quickly and accurately.

BACKGROUND OF THE INVENTION

FIG. 22 is a block diagram showing a structure of a conventional multi-channel input system. FIG. 22 shows a structure of a conventional multi-channel input system having a plurality of terminals and a radio keyboard corresponding to each terminal. The terminal and its corresponding keyboard are connected to each other via radio links according to a multi-channel system.

Specifically, the multi-channel input system is constructed of n terminals 101 to 10n, and n radio keyboards 201 to 20n that are connected to the terminals respectively. The terminals and radio keyboards transmit and receive key data by utilizing channels CH1 to CHn respectively.

The terminal 101 is a personal computer, which is connected to the radio keyboard 201 via a radio link. This terminal 101 is provided with a channel-setting switch 111 and a radio interface 121 in addition to a CPU (Central Processing Unit) and a memory not shown.

The channel-setting switch 111 is a DIP switch or a dial switch, and this is a manual switch for setting one of the channels CH1 to CHn that can be utilized in the multi-channel input system to the radio interface 121. In the example shown in this drawing, the channel CH1 has been set to the radio interface 121 by the channel-setting switch 111.

The radio interface 121 is an interface for receiving the key data from the radio keyboard 201 via the radio link by utilizing the channel CH1 set by the channel-setting switch 111.

The radio keyboard 201 is connected to the terminal 101 via the radio link. This radio keyboard 201 is provided with a key section 211, a channel-setting switch 221, and a radio interface 231.

The key section 211 is constructed of alphabet keys, number keys, function keys, a space key, and an enter key. Each time when each key is depressed, a key code corresponding to this key is output.

The channel-setting switch 221 is a DIP switch or a dial switch, and this is a manual switch for setting one of the channels CH1 to CHn (the same channel as that set to the radio interface 121) to the radio interface 231. In the example shown in this drawing, the channel CH1 has been set to the radio interface 231 by the channel-setting switch 221.

The radio interface 231 is an interface for transmitting the key data from the key section 211 via the radio link by utilizing the channel CH1 set by the channel-setting switch 221.

The terminal 102 is a personal computer, which is connected to the radio keyboard 202 via a radio link. This terminal 102 is provided with a channel-setting switch 112 and a radio interface 122 in addition to a CPU and a memory not shown.

The channel-setting switch 112 is a DIP switch or a dial switch, and this is a manual switch for setting one of the channels CH1 to CHn that can be utilized in the multi-channel input system to the radio interface 122. In the example shown in this drawing, the channel CH2 has been set to the radio interface 122 by the channel-setting switch 112.

The radio interface 122 is an interface for receiving the key data from the radio keyboard 202 via the radio link by utilizing the channel CH2 set by the channel-setting switch 112.

The radio keyboard 202 is connected to the terminal 102 via the radio link. This radio keyboard 202 is provided with a key section 212, a channel-setting switch 222, and a radio interface 232.

The key section 212 is constructed of alphabet keys, number keys, function keys, a space key, and an enter key. Each time when each key is depressed, a key code corresponding to this key is output.

The channel-setting switch 222 is a DIP switch or a dial switch, and this is a manual switch for setting one of the channels CH1 to CHn (the same channel as that set to the radio interface 122) to the radio interface 232. In the example shown in this drawing, the channel CH2 has been set to the radio interface 232 by the channel-setting switch 222.

The radio interface 232 is an interface for transmitting the key data from the key section 212 via the radio link by utilizing the channel CH2 set by the channel-setting switch 222.

Similarly, the terminal 10n is a personal computer, which is connected to the radio keyboard 20n via a radio link. This terminal 10n is provided with a channel-setting switch 11n and a radio interface 12n in addition to a CPU and a memory not shown.

The channel-setting switch 11n is a DIP switch or a dial switch, and this is a manual switch for setting one of the channels CH1 to CHn that can be utilized in the multi-channel input system to the radio interface 12n. In the example shown in this drawing, the channel CHn has been set to the radio interface 12n by the channel-setting switch 11n.

The radio interface 12n is an interface for receiving the key data from the radio keyboard 20n via the radio link by utilizing the channel CHn set by the channel-setting switch 11n.

The radio keyboard 20n is connected to the terminal 10n via the radio link. This radio keyboard 20n is provided with a key section 21n, a channel-setting switch 22n, and a radio interface 23n.

The key section 21n is constructed of alphabet keys, number keys, function keys, a space key, and an enter key. Each time when each key is depressed, a key code corresponding to this key is output.

The channel-setting switch 22n is a DIP switch or a dial switch, and this is a manual switch for setting one of the channels CH1 to CHn (the same channel as that set to the radio interface 12n) to the radio interface 23n. In the example shown in this drawing, the channel CHn has been set to the radio interface 23n by the channel-setting switch 22n.

The radio interface 23n is an interface for transmitting the key data from the key section 21n via the radio link by utilizing the channel CHn set by the channel-setting switch 22n.

In the above structure, for setting the channel CH1 to the terminal 101 and the radio keyboard 201 corresponding to this terminal respectively, a user operates the channel-setting switch 111 to set the channel CH1 to the radio interface 121, and then operates the channel-setting switch 221 to set the channel CH1 to the radio interface 231.

Similarly, for setting the channel CH2 to the terminal 102 and the radio keyboard 202 corresponding to this terminal respectively, other user operates the channel-setting switch 112 to set the channel CH2 to the radio interface 122, and then operates the channel-setting switch 222 to set the channel CH2 to the radio interface 232.

According to the above-described conventional multi-channel input system, there is no mechanism for managing the channel setting in the system as a whole. Therefore, users cannot easily understand channels that have been set at other terminals and radio keyboards.

For the above reason, there occurs such a situation that the user of the terminal 102, for example, unconsciously sets the channel CH1 to the terminal 102 and the radio keyboard 202 without knowing that this channel CH1 has already been set at the terminal 101 and the radio keyboard 201.

In this case, there has been a problem that the terminal 101 can receive key data from both the radio keyboard 201 and the radio keyboard 202, and this results in the occurrence of interference.

Further, when the terminal 101 and the radio keyboard 202 are installed close to each other, the terminal 101 can receive the key data of the channel CH2 that has already been set to the other radio keyboard 202, in addition to the key data of the channel CH1 that has been set to the own terminal.

Further, there has been a problem that even if the set channel of the terminal 101 and the radio keyboard 201 has been changed from the channel CH1 to the channel CH2, the terminal 101 can receive the key data from both the radio keyboard 201 and the radio keyboard 202, and this results in the occurrence of interference.

Further, according to the conventional multi-channel input system, it is necessary to manually operate the channel setting switch after visually confirming the setting of other channels based on the status of other channel-setting switches. As a result, there has been a problem that it takes time to set the channels, and errors easily occur in the channel setting.

SUMMARY OF THE INVENTION

It is an object of the present invention to provide a method of and an apparatus for multi-channel management, a multi-channel interference management method, a multi-channel terminal, a method of and an apparatus for multi-channel setting, and a computer product that can prevent interference in multi-channel communications and that can carry out a channel setting quickly and accurately.

The multi-channel management apparatus according to one aspect of the present invention is applied to a multi-channel input system for making cordless connection between a plurality of terminals and a plurality of input apparatuses corresponding to these terminals based on a multi-channel system. This multi-channel management apparatus comprises: a management unit which manages a setting status of each channel in the multi-channel input system, and a notification unit which notifies the setting status to each terminal according to a request from the terminal.

The multi-channel management method according to another aspect of the present invention is applied to a multi-channel input system for making cordless connection between a plurality of terminals and a plurality of input apparatuses corresponding to these terminals based on a multi-channel system. This multi-channel management method comprises: managing a setting status of each channel in the multi-channel input system, and notifying the setting status to each terminal according to a request from the terminal.

The multi-channel terminal according to still another aspect of the present invention is in cordless connection to an input apparatus by utilizing a set channel that has been set in advance out of a plurality of channels based on a multi-channel system. This multi-channel terminal comprises: a checking unit which checks presence or absence of a data reception in a channel other than a set channel during a period while the set channel has no data reception, and an interference channel candidate extraction unit which selects a channel as a candidate interference channel having a possibility of the occurrence of interference at the time of updating the set channel, when the checking unit has detected a data reception.

The multi-channel interference management method according to still another aspect of the present invention is applied to a multi-channel terminal that is in cordless connection to an input apparatus by utilizing a set channel that has been set in advance out of a plurality of channels based on a multi-channel system. This multi-channel interference management method comprises: checking presence or absence of a data reception in a channel other than a set channel during a period while the set channel has no data reception, and selecting a channel as a candidate interference channel having a possibility of the occurrence of interference at the time of updating the set channel, when there has been a data reception at the checking process.

The multi-channel setting apparatus according to still another aspect of the present invention is applied to a multi-channel input system for making cordless connection between a plurality of terminals and a plurality of input apparatuses corresponding to these terminals based on a multi-channel system. This multi-channel setting apparatus comprises: a management unit which manages a setting status of each channel in the multi-channel input system, and a setting unit which finds a free channel based on the setting status, and sets the free channel to between a terminal that requires the setting of a channel and an input apparatus corresponding to this terminal.

The multi-channel setting method according to still another aspect of the present invention is applied to a multi-channel input system for making cordless connection between a plurality of terminals and a plurality of input apparatuses corresponding to these terminals based on a multi-channel system. This multi-channel setting method comprises: managing a setting status of each channel in the multi-channel input system, and finding a free channel based on the setting status, and setting the free channel to between a terminal that requires the setting of a channel and an input apparatus corresponding to this terminal.

The computer program according to still another aspect of the present invention contains instructions which when executed on a computer realizes the methods according to the present invention on the computer.

Other objects and features of this invention will become apparent from the following description with reference to the accompanying drawings.

BRIEF DESCRIPTION OF THE DRAWINGS

FIG. 3 is a diagram showing a channel-setting table 110 in first and second embodiments according to the present invention, FIG. 4 is a diagram showing an interference check table 120 in the first and second embodiments, FIG. 10 is a diagram showing an interference notification screen 600 in the first and second embodiments, FIG. 11 is a diagram showing an interference notification screen 610 in the first and second embodiments, FIG. 12 is a diagram showing a channel setting confirmation screen 620 in the first and second embodiments, FIG. 18 is a diagram showing a channel setting completion screen 1000 in the second embodiment, FIG. 19 is a diagram showing an error screen 1010 in the second embodiment.

DETAILED DESCRIPTIONS

Embodiments of the method of and the apparatus for multi-channel management, the multi-channel interference management method, the multi-channel terminal, the method of and the apparatus for multi-channel setting, and the computer programs according to the present invention will be explained in detail below with reference to the accompanying drawings.

Figure 1:
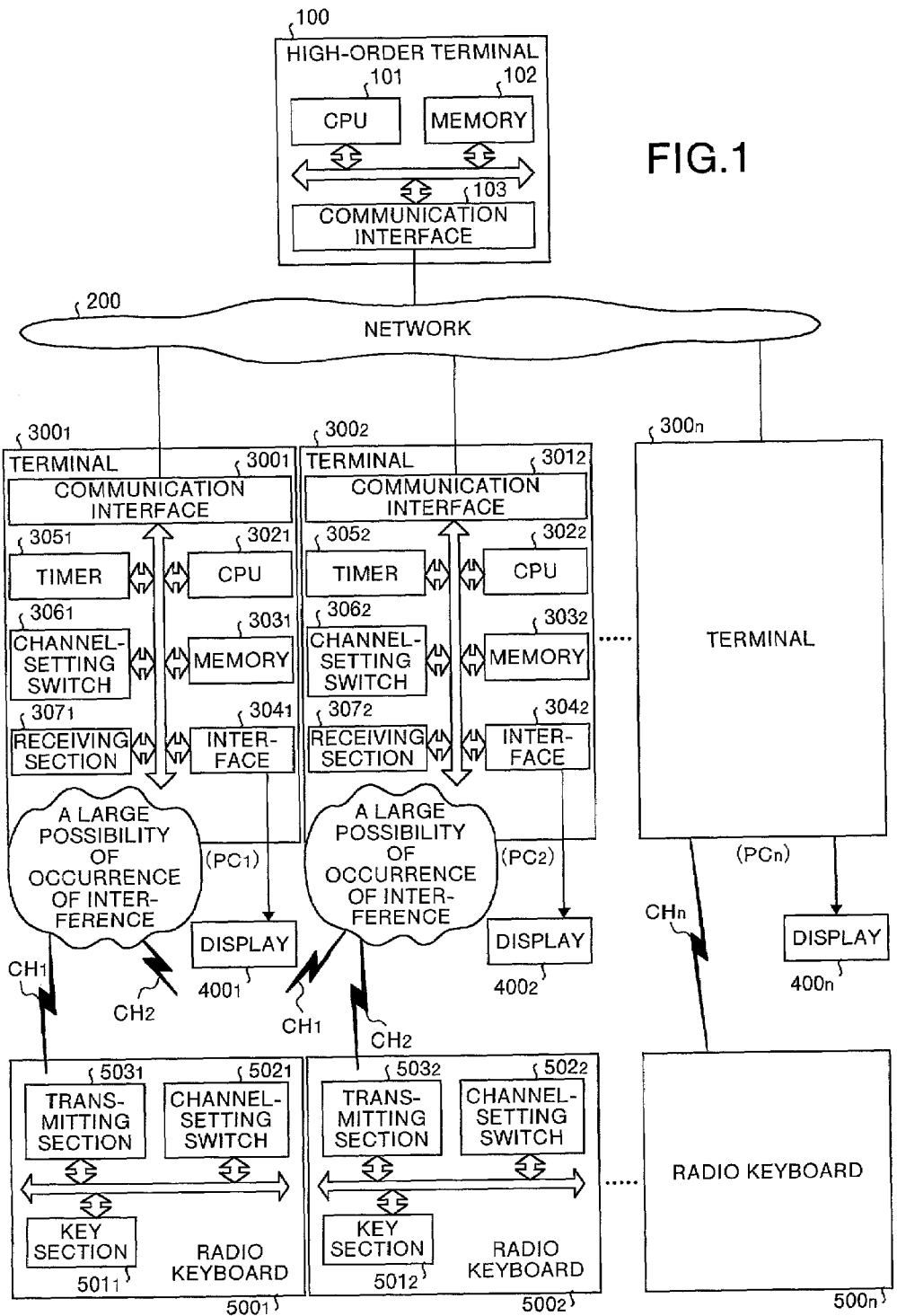
FIG. 1 is a block diagram showing a structure of a first embodiment of the present invention.

FIG. 1 is a block diagram showing a structure of a first embodiment of the present invention. FIG. 1 shows a multi-channel input system that has a plurality of terminals connected to a plurality of radio keyboards corresponding to these terminals via radio links based on a multi-channel system, for enabling a high-order terminal to manage the setting of the plurality of channels, and catch the interference status of the channels.

Specifically, the multi-channel input system is constructed of a high-order terminal 100 for managing the setting of channels CH1 to CHn (refer to FIG. 2) and catching a channel interference status, n terminals 3001 to 300n that are connected to the high-order terminal 100 via a network 200, displays 4001 to 400n that are connected to these terminals 3001 to 300n respectively, and n radio keyboards 5001 to 500n corresponding to the terminals 3001 to 300n respectively. In this multi-channel input system, key data are transmitted and received in the units of terminals and radio keyboards by utilizing the channels CH1 to CHn.

The high-order terminal 100 is a personal computer for managing the setting of the channels CH1 to CHn and catching a channel interference status. The high-order terminal 100 can communicate with the terminals 3001 to 300n via the network 200. In this high-order terminal 100, a CPU 101 executes the management of the setting of the channels The operation of the CPU 101 will be explained in detail later with reference to a flowchart.

A memory 102 stores a channel-setting table 110 (refer to FIG. 3) and an interference check table 120 (refer to FIG. 4). The channel-setting table 110 shown in FIG. 3 is a table showing a relationship between the channels (channels CH1 to CHn) that can be utilized in the multi-channel input system and terminal IDs (PC1 to PCn) that identify terminals to which these channels have been set.

PC1 to PCn are the terminal IDs that are given to the terminals 3001 to 300n shown in FIG. 1 respectively. In FIG. 1, PC1 to PCn are also attached to the radio keyboards 5001 to 500n respectively.

In the channel-setting table 110 shown in FIG. 3, the channels CH1 and CH2 are set to the terminal 3001 (the radio keyboard 5001) and the terminal 3002 (the radio keyboard 5002) corresponding to the terminal IDs of PC1 and PC2 respectively.

On the other hand, the channels CH3 and CH4 are not set to any terminals, and these are free channels. The channels CH5 to CHn are set to the terminal 3005 (the radio keyboard 5005) (not shown) to the terminal 300n (the radio keyboard 500n) corresponding to the terminal IDs of PC5 to PCn respectively. As explained above, in the multi-channel input system, one channel is set to one terminal (radio keyboard).

The interference check table 120 shown in FIG. 4 is a table for checking whether or not there is a possibility of the occurrence of interference at a terminal corresponding to the terminal ID. In this case, the term interference means a status that one terminal can receive key data of other channels than a channel set to this terminal (hereinafter, this channel is called a set channel). In other words, this is the status that this terminal can receive key data of a plurality of channels.

In the interference check table 120, presence or absence of a reception of each channel (channels CH1 to CHn) is checked for each terminal ID (PC1, PC2, PC5, - - - , PCn) In this table, channels are not set to the terminals 3003 and 3004 (not shown) corresponding to the terminal IDs of PC3 and PC4 respectively, as these terminals cannot be used.

In this table, "set" means that this channel is a set channel, and this table corresponds to the channel-setting table 110 (refer to FIG. 3). ○ means that a terminal corresponding to this terminal ID has received key data and a terminal ID of this channel. On the other hand, x means that a terminal corresponding to this terminal ID has not received key data and a terminal ID of this channel.

For example, at the terminal 3001 (refer to FIG. 1) that has PC1 as this terminal ID, the channel CH1 is set as a set channel of this terminal, and this terminal has received the channel CH2. Accordingly, this terminal 3001 has a possibility of the occurrence of interference when the channel CH1 has been changed to the channel CH2.

At the terminal 3002 (refer to FIG. 1) that has PC2 as this terminal ID, the channel CH2 is set as a set channel of this terminal, and this terminal has received the channel CH1. Accordingly, this terminal 3002 has a possibility of the occurrence of interference when the channel CH2 has been changed to the channel CH1.

Referring back to FIG. 1, a communication interface 103 is an interface for controlling the communications with the terminals 3001 to 300n. The terminals 3001 to 300n are personal computers. These terminals 3001 to 300n are connected to the radio keyboards 5001 to 500n (however, the radio keyboards 5003 and 5004 are not used), by utilizing the channels CH1 to CHn (however, the channels CH3 and CH4 are free channels), via the radio links.

At the terminal 3001, a communication interface 3011 is an interface for controlling the communications with the high-order terminal 100. A CPU 3021 is for controlling each section, and this CPU catches an interference status, and executes various kinds of processing. The operation of this CPU 3021 will be explained in detail later. A memory 3031 stores various kinds of data.

An interface 3041 takes an interface between the CPU 3021 and the display 4001. The display 4001 is a CRT (Cathode Ray Tube) or an LCD (Liquid Crystal Display), and displays information, images, and various kinds of screens to be described later (refer to FIG. 10 to FIG. 12) according to key inputs.

A timer 3051 has a clock function, and outputs time data to the CPU 3021. A channel-setting switch 3061 is a DIP switch or a dial switch, and this is a manual switch for setting one of the channels CH1 to CHn that can be utilized in the multi-channel input system to a receiving section 3071. In the example shown in this drawing, the channel CH1 has been set to the receiving section 3071 by the channel-setting switch 3061.

Figure 2:
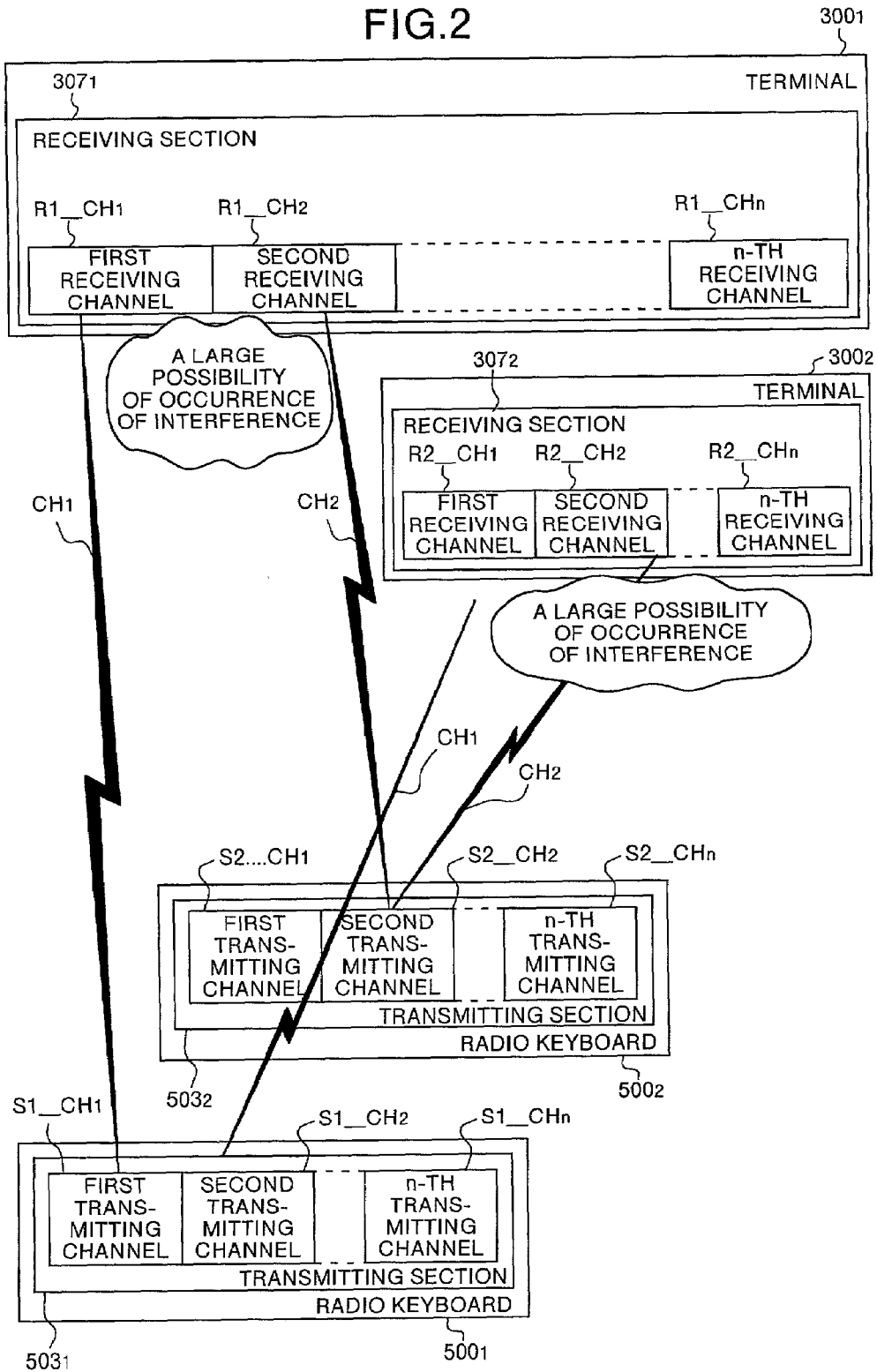
FIG. 2 is a diagram for explaining a channel setting in the first embodiment.

The receiving section 3071 receives key data and a terminal ID from the radio keyboard 5001 via the radio link, by utilizing the channel CH1 that has been set by the channel-setting switch 3061. This receiving section 3071 has a first receiving channel R1_CH1 to an n-th receiving channel R1_CHn, as shown in FIG. 2.

The first receiving channel R1_CH1 to the n-th receiving channel R1_CHn correspond to the channels CH1 to CHn respectively. In the example shown in the drawing, the first receiving channel R1_CH1 has been selected by the channel-setting switch 3061 (refer to FIG. 1), and thus, the channel CH1 has been set.

The radio keyboard 5001 is connected to the terminal 3001 via the radio link. The radio keyboard 5001 is provided with a key section 5011, a channel-setting switch 5021, and a transmitting section 5031.

The key section 5011 is constructed of alphabet keys, number keys, function keys, a space key, and an enter key. Each time when each key is depressed, a key code corresponding to this key is output.

The channel-setting switch 5021 is a DIP switch or a dial switch, and this is a manual switch for setting one of the channels CH1 to CHn (the same channel as that set to the receiving section 3071) to the transmitting section 5031. In the example shown in this drawing, the channel CH1 has been set to the transmitting section 5031 by the channel-setting switch 5021.

The transmitting section 5031 transmits the key data and the terminal ID (=PC1) from the key section 5011 via the radio link, by utilizing the channel CH1 that has been set by the channel-setting switch 5021. This transmitting section 5031 has a first transmitting channel S1_CH1 to an n-th transmitting channel S1_CHn, as shown in FIG. 2.

The first transmitting channel S1_CH1 to the n-th transmitting channel S1_CHn correspond to the channels CH1 to CHn respectively. In the example shown in the drawing, the first transmitting channel S1_CH1 has been selected by the channel-setting switch 5021 (refer to FIG. 1), and thus, the channel CH1 has been set.

At the terminal 3002, a communication interface 3012 is an interface for controlling the communications with the high-order terminal 100. A CPU 3022 is for controlling each section, and this CPU catches an interference status, and executes various kinds of processing. The operation of this CPU 3022 will be explained in detail later. A memory 3032 stores various kinds of data.

An interface 3042 takes an interface between the CPU 3022 and the display 4002. The display 4002 is a CRT or an LCD, and displays information, images, and various kinds of screens to be described later (refer to FIG. 10 to FIG. 12) according to key inputs.

A timer 3052 has a clock function, and outputs time data to the CPU 3022. A channel-setting switch 3062 is a DIP switch or a dial switch, and this is a manual switch for setting one of the channels CH1 to CHn that can be utilized in the multi-channel input system to a receiving section 3072. In the example shown in this drawing, the channel CH2 has been set to the receiving section 3072 by the channel-setting switch 3062.

The receiving section 3072 receives key data and a terminal ID from the radio keyboard 5002 via the radio link, by utilizing the channel CH2 that has been set by the channel-setting switch 3062. This receiving section 3072 has a first receiving channel R2_CH1 to an n-th receiving channel R2_CHn, as shown in FIG. 2.

The first receiving channel R2_CH1 to the n-th receiving channel R2_CHn correspond to the channels CH1 to CHn respectively. In the example shown in the drawing, the second receiving channel R2_CH2 has been selected by the channel-setting switch 3062 (refer to FIG. 1), and thus, the channel CH2 has been set.

The radio keyboard 5002 is connected to the terminal 3002 via the radio link. The radio keyboard 5002 is provided with a key section 5012, a channel-setting switch 5022, and a transmitting section 5032.

The key section 5012 is constructed of alphabet keys, number keys, function keys, a space key, and an enter key. Each time when each key is depressed, a key code corresponding to this key is output.

The channel-setting switch 5022 is a DIP switch or a dial switch, and this is a manual switch for setting one of the channels CH1 to CHn (the same channel as that set to the receiving section 3072) to the transmitting section 5032. In the example shown in this drawing, the channel CH2 has been set to the transmitting section 5032 by the channel-setting switch 5022.

The transmitting section 5032 transmits the key data and the terminal ID (=PC2) from the key section 5012 via the radio link, by utilizing the channel CH2 that has been set by the channel-setting switch 5022. This transmitting section 5032 has a first transmitting channel S2_CH1 to an n-th transmitting channel S2_CHn, as shown in FIG. 2.

The first transmitting channel S2_CH1 to the n-th transmitting channel S2_CHn correspond to the channels CH1 to CHn respectively. In the example shown in the drawing, the second transmitting channel S2_CH2 has been selected by the channel-setting switch 5022 (refer to FIG. 1), and thus, the channel CH2 has been set.

Referring back to FIG. 1, the terminal 300n has the same structure as that of the above-described terminal 3001. The display 400n is a CRT or an LCD for displaying various kinds of information and screens. The radio keyboard 500n has the same structure as that of the above-described radio keyboard 5001, and is connected to the terminal 300n via the radio link (channel CHn).

Figure 5:
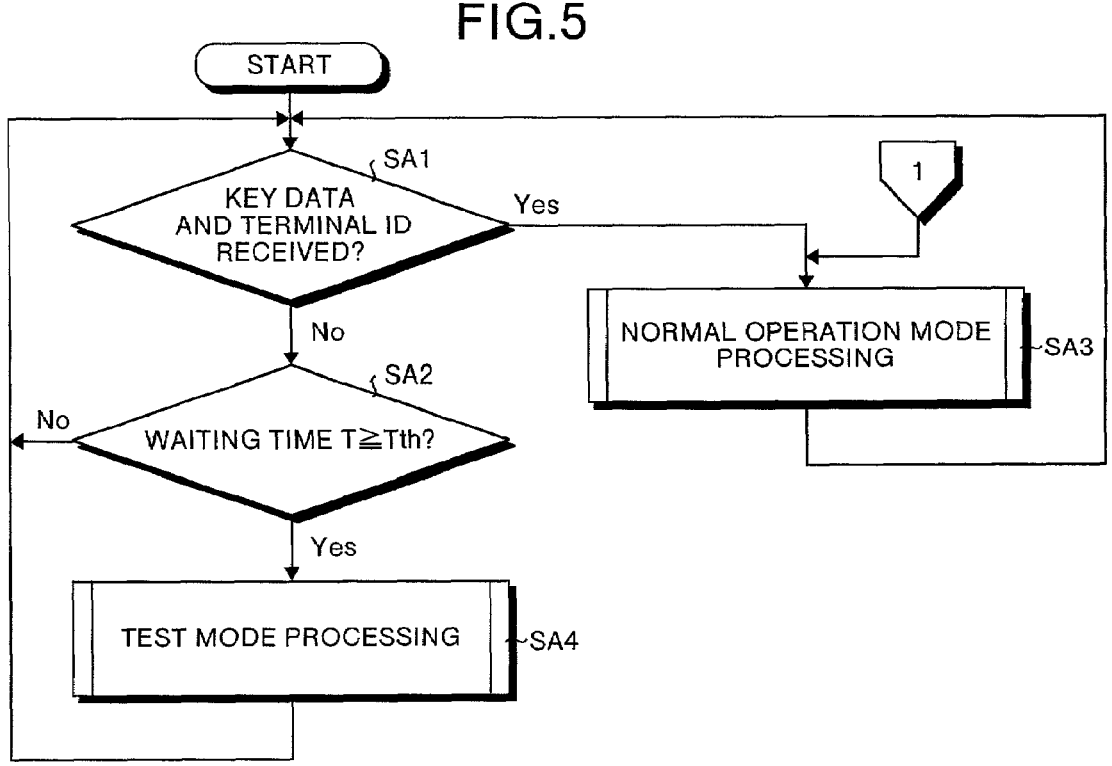
FIG. 5 is a flowchart for explaining the operation of terminals 3001 to 300n shown in FIG. 1.
Figure 6:
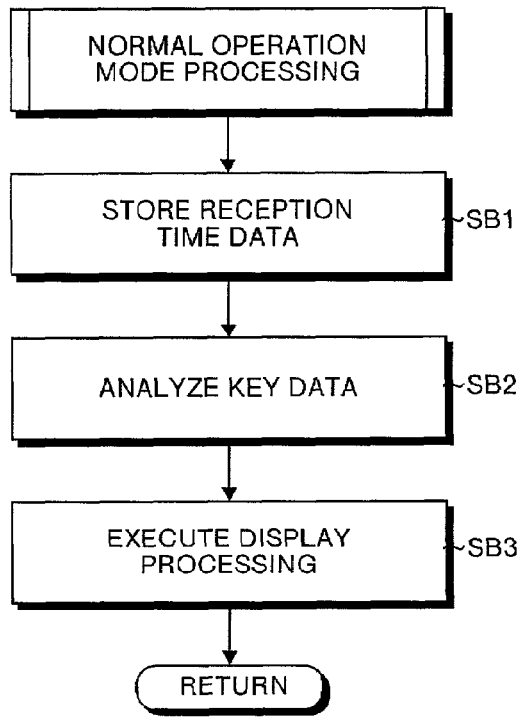
FIG. 6 is a flowchart for explaining a normal operation mode processing shown in FIG. 5.
Figure 7:
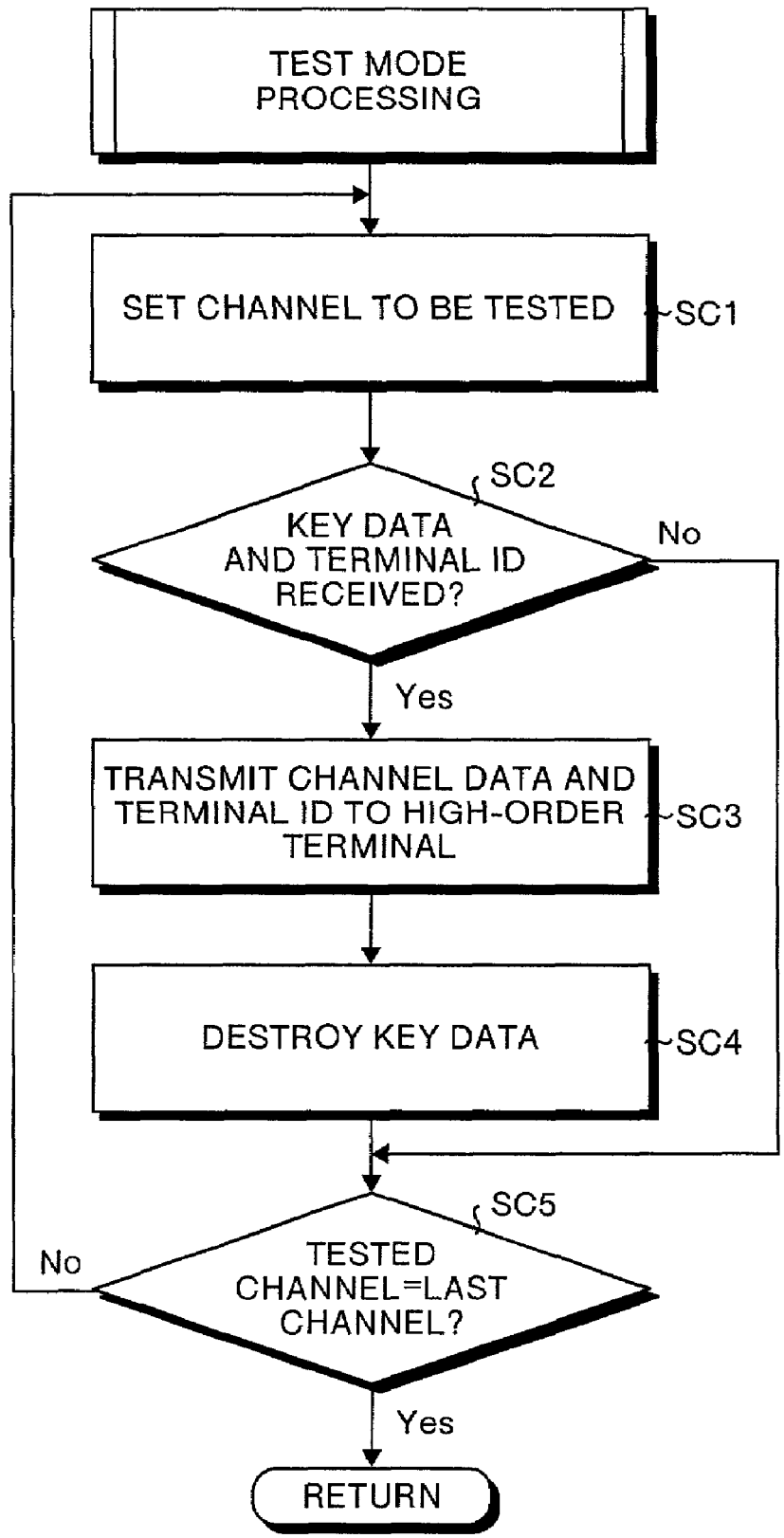
FIG. 7 is a flowchart for explaining a test mode processing shown in FIG. 5.
Figure 8:
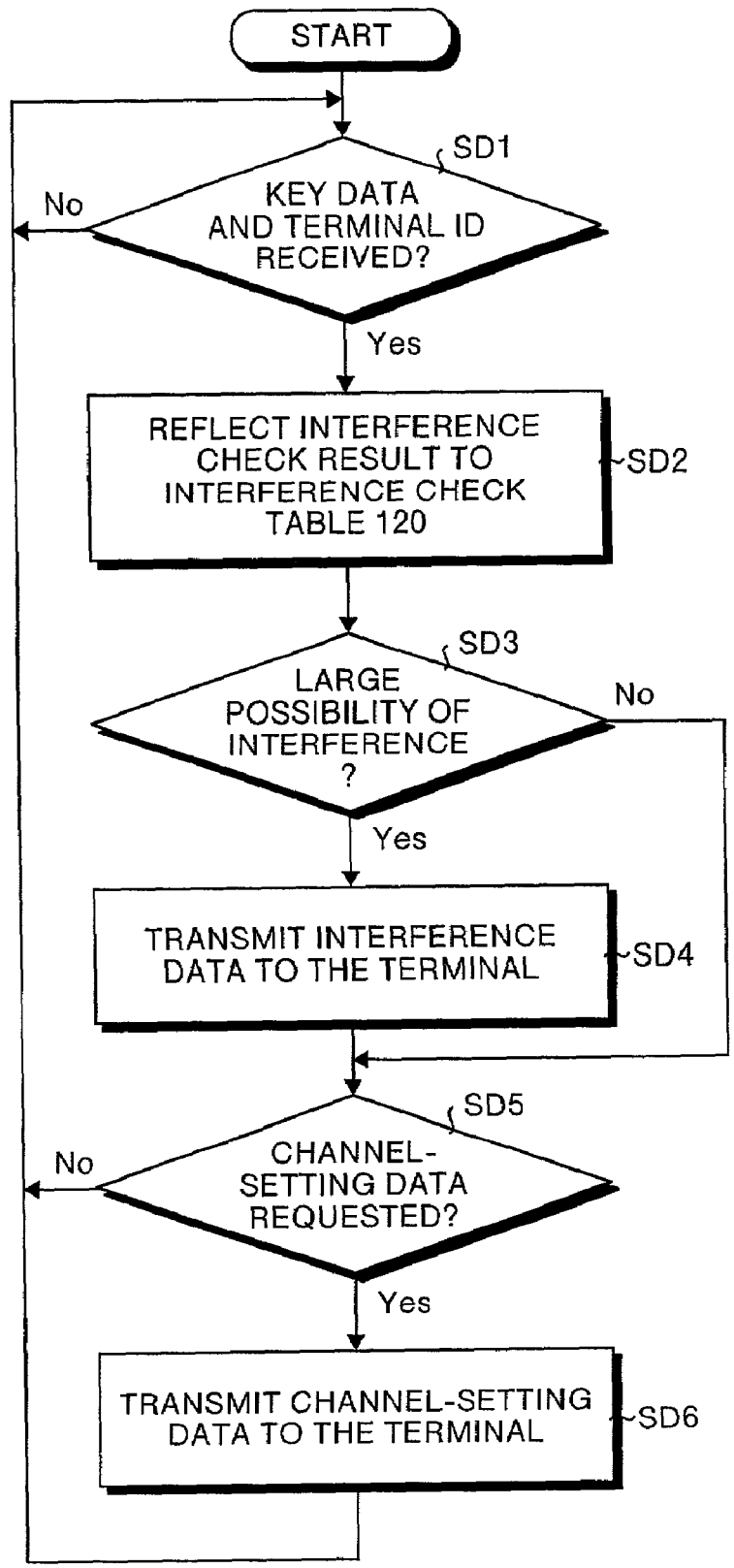
FIG. 8 is a flowchart for explaining the operation of a high-order terminal 100 shown in FIG. 1.

Next, the operation of the first embodiment will be explained in detail with reference to flowcharts shown in FIG. 5 to FIG. 8 and screens shown in FIG. 10 to FIG. 12. FIG. 5 is a flowchart for explaining the operation of the terminals 3001 to 300n shown in FIG. 1. FIG. 6 is a flowchart for explaining a normal operation mode processing shown in FIG. 5. FIG. 7 is a flowchart for explaining a test mode processing shown in FIG. 5. FIG. 8 is a flowchart for explaining the operation of the high-order terminal 100 shown in FIG. 1.

The operation of the terminals 3001 and 3002 shown in FIG. 1 will be mainly explained below. Referring to FIG. 5, at step SA1, the CPU 3021 of the terminal 3001 decides whether or not the first receiving channel R1_CH1 (refer to FIG. 2) corresponding to the set channel (in this case, the channel CH1) has received the key data and the terminal ID (=PC1) from the radio keyboard 5001. In this case, the CPU 3021 sets "No" as a result of the decision made.

At step SA2, the CPU 3021 decides whether or not a reception waiting time T is equal to or higher than a predetermined threshold value Tth. This waiting time T is a time taken from when the key data and the terminal ID have been received last time (hereinafter, to be referred to as a reception time) till the current point of time. This waiting time is calculated based on time data from the timer 3051.

In this case, the CPU 3021 sets "No" at step SA2 as a result of the decision made. Thereafter, the CPU 3021 repeats making a decision at step SA1 and step SA2 until when a result of the decision made at step SA1 becomes "Yes" or until when a result of the decision made at step SA2 becomes "Yes". The CPU 3022 of the terminal 3002 also carries out a similar operation to that of the CPU 3021 of the terminal 3001 based on the flowchart shown in FIG. 5.

On the other hand, referring to FIG. 8, at step SD1, the CPU 101 of the high-order terminal 100 decides whether or not channel data and a terminal ID have been received from any one of the terminals 3001 to 300n. In this case, the CPU 101 sets "No" as a result of the decision made. Thereafter, the CPU 101 repeats making a decision in a similar manner. In this case, the channel data is the key data and the data that expresses a channel corresponding to the terminal ID that have been received at the terminal in a test mode processing (refer to FIG. 7) to be described later. The test mode and the corresponding channel will be described in detail later.

When any one key of the key section 5011 of the radio keyboard 5001 has been depressed, the transmitting section 5031 shown in FIG. 2 transmits the key data corresponding to this key and the terminal ID (=PC1), via the radio link (the channel CH1). When the key data and the terminal ID (=PC1) have been received by the receiving section 3071 of the terminal 3001, the CPU 3021 of the terminal 3001 sets "Yes" as a result of the decision made at step SA1 shown in FIG. 5.

At step SA3, the CPU 3021 executes a normal operation mode processing for carrying out a control display to the display 4001, based on the key data. Specifically, at step SB1 shown in FIG. 6, the CPU 3021 stores in the memory 3031 the reception time at the receiving section 3071 as the reception time data, based on the time data from the timer 3051.

At step SB2, the CPU 3021 analyzes the received key data. At step SB3, the CPU 3021 makes the information like a text displayed on the display 4001, based on a result of the analysis at step SB2, and thereafter, executes the processing at step SA1 afterwards shown in FIG. 5.

When a keyboard operation of the radio keyboard 5001 has not been carried out over or above a predetermined period, that is, when the waiting time T (the last reception time–the current time) at step SA2 becomes equal to or above the threshold value Tth, the CPU 3021 sets "Yes" as a result of the decision made at step SA2.

At step SA4, the CPU 3021 executes a test mode processing for testing an interference status about which receiving channel has received key data and a terminal ID, by scanning the first receiving channel R1_CH1 to the n-th receiving channel R1_CHn shown in FIG. 2.

In other words, when a receiving channel other than the first receiving channel R1_CH1 corresponding to the set channel (the channel CH1) has received the key data and the terminal ID, this means that changing the setting of the channel to this receiving channel involves a large possibility of the occurrence of interference.

Specifically, at step SC1 shown in FIG. 7, the CPU 3021 sets the first receiving channel R1_CH1 (the channel CH1) to the receiving section 3071 as a channel to be tested. At step SC2, the CPU 3021 decides whether or not the first receiving channel R1_CH1 (the channel CH1) has received the key data and the terminal ID (=PC1) from the radio keyboard 5001. In this case, the CPU 3021 sets "No" as a result of the decision made.

At step SC5, the CPU 3021 decides whether or not the tested channel (in this case, the first receiving channel R1_CH1 (the channel CH1)) is the last channel (the n-th receiving channel R1_CHn (the channel CHn)). In this case, the CPU 3021 sets "No" as a result of the decision made.

At step SC1, the CPU 3021 sets the second receiving channel R1_CH2 (the channel CH2) to the receiving section 3071 as a channel to be tested. At step SC2, the CPU 3021 decides whether or not the second receiving channel R1_CH2 (the channel CH2) has received the key data and the terminal ID (=PC2) from the radio keyboard 5002.

When the key data and the terminal ID (=PC2) from the radio keyboard 5002 have been received by the second receiving channel R1_CH2 (the channel CH2), the CPU 3021 sets "Yes" as a result of the decision made at step SC2. At step SC3, the CPU 3021 transmits the channel data according to the reception (in this case, the channel CH2) and the terminal ID according to the own terminal (=PC1) to the high-order terminal 100 via the network 200.

At step SC4, the CPU 3021 destroys the key data from the radio keyboard 5002 that has been received by the second receiving channel R1_CH2 (the channel CH2). At step SC5, the CPU 3021 decides whether or not the tested channel (in this case, the second receiving channel R1_CH2 (the channel CH2)) is the last channel (the n-th receiving channel R1_CHn (the channel CHn)). In this case, the CPU 3021 sets "No" as a result of the decision made. Thereafter, the CPU 3021 repeats executing the scanning processing at step SC1 afterwards until when the tested channel becomes the last channel.

Further, when the channel data (in this case, the channel CH2) and the terminal ID (=PC1) transmitted at step SC3 have been received by the high-order terminal 100, the CPU 101 of the high-order terminal 100 sets "Yes" as a result of the decision made at step SD1 shown in FIG. 8.

At step SD2, the CPU 101 reflects the interference checking result in the interference check table 120 shown in FIG. 4. The interference checking result in this case is the channel data (in this case, the channel CH2) and the terminal ID (=PC1).

In other words, the CPU 101 sets O to a cross point between "CH2" and "PC1" in the interference check table 120. O means that the terminal 3001 (refer to FIG. 1) corresponding to the terminal ID (PC1) has received the key data and the terminal ID (=PC2) of the channel CH2. In the interference check table 120, "set" and "x" have been set in default.

At step SD3, the CPU 101 decides whether or not there is a large possibility of the occurrence of interference in the terminal ID (=PC1) by referring to the interference check table 120. In this case, the possibility of the occurrence of interference means that there is a possibility of the occurrence of interference between the key data from the radio keyboard 5001 corresponding to the terminal 3001 and the key data from the radio keyboard 5002 corresponding to the other terminal 3002 in the same channel (in this case, the channel CH2), when the current set channel (in this case, the channel CH1) has been changed to the other set channel (in this case, the channel CH2).

Specifically, the CPU 101 decides that there is a large possibility of the occurrence of interference when a channel other than the set channel (=the channel CH1) has been set with o by using the terminal ID (=PC1) as a key in the interference check table 120. In this case, the channel CH2 is set with O. Therefore, the CPU 101 sets "Yes" as a result of the decision made at step SD3. When a result of the decision made at step SD3 is "No", the CPU 101 makes decision at step SD5.

At step SD4, the CPU 101 transmits data according to the set channel (in this case, the channel CH1) and the interference channel (in this case, the channel CH2) as the interference data to the terminal 3001 via the network 200.

At step SD5, the CPU 101 decides whether or not a channel-setting data has been requested from any one out of the terminals 3001 to 300n. In this case, the CPU 101 sets "No" as a result of the decision made. Then, the CPU 101 makes decision at step SD1 afterwards. The channel-setting data is the data corresponding to the channel-setting table 110 shown in FIG. 3.

When the terminal 3001 has received the interference data transmitted at step SD4, the CPU 3021 makes an interference notification screen 600 shown in FIG. 10 displayed on the display 4001.

This interference notification screen 600 is a screen for notifying a possibility of the occurrence of interference to a user when the setting of the current set channel (the channel CH1) has been changed to the interference channel (the channel CH2). Accordingly, this user sets other free channel by avoiding the interference channel at the time of changing the setting of the channel.

Next, explanation will be given about the case where there is a large possibility of the occurrence of interference at the terminal 3002. Referring to FIG. 5, at step SA1, the CPU 3022 of the terminal 3002 decides whether or not the first receiving channel R2_CH1 (refer to FIG. 2) corresponding to the set channel (in this case, the channel CH2) has received the key data and the terminal ID (=PC2) from the radio keyboard 5002. In this case, the CPU 3022 sets "No" as a result of the decision made.

At step SA2, the CPU 3022 decides whether or not a reception waiting time T is equal to or higher than a predetermined threshold value Tth. In this case, when a keyboard operation of the radio keyboard 5002 has not been carried out over or above a predetermined period, that is, when the waiting time T (the last reception time–the current time) becomes equal to or above the threshold value Tth, the CPU 3022 sets "Yes" as a result of the decision made at step SA2.

At step SA4, the CPU 3022 executes a test mode processing for testing an interference status of which receiving channel has received key data and a terminal ID, by scanning the first receiving channel R2_CH1 to the n-th receiving channel R2_CHn shown in FIG. 2.

In other words, when a receiving channel other than the first receiving channel R2_CH1 corresponding to the set channel (the channel CH2) has received the key data and the terminal ID, this means that there is a large possibility of the occurrence of interference when the setting of the channel has been changed to this receiving channel.

Specifically, at step SC1 shown in FIG. 7, the CPU 3022 sets the first receiving channel R2_CH1 (the channel CH1) to the receiving section 3072 as a channel to be tested. At step SC2, the CPU 3022 decides whether or not the first receiving channel R2_CH1 (the channel CH1) has received the key data and the terminal ID (=PC1) from the radio keyboard 5001.

When the key data and the terminal ID (=PC1) from the radio keyboard 5001 have been received by the first receiving channel R2_CH1 (the channel CH1), the CPU 3022 sets "Yes" as a result of the decision made at step SC2. At step SC3, the CPU 3022 transmits the channel data according to the reception (in this case, the channel CH1) and the terminal ID according to the own terminal (=PC2) to the high-order terminal 100 via the network 200.

At step SC4, the CPU 3022 destroys the key data from the radio keyboard 5001 that has been received by the first receiving channel R2_CH1 (the channel CH1). At step SC5, the CPU 3022 decides whether or not the tested channel (in this case, the first receiving channel R2_CH1 (the channel CH1)) is the last channel (the n-th receiving channel R2_CHn (the channel CHn)). In this case, the CPU 3022 sets "No" as a result of the decision made. Thereafter, the CPU 3022 repeats executing the scanning processing at step SC1 afterwards until when the tested channel becomes the last channel.

Further, when the channel data (in this case, the channel CH1) and the terminal ID (=PC2) transmitted at step SC3 have been received by the high-order terminal 100, the CPU 101 of the high-order terminal 100 sets "Yes" as a result of the decision made at step SD1 shown in FIG. 8.

At step SD2, the CPU 101 reflects the interference checking result in the interference check table 120 shown in FIG. 4. The interference checking result in this case is the channel data (in this case, the channel CH1) and the terminal ID (=PC2).

In other words, the CPU 101 sets O to a cross point between "CH1" and "PC2" in the interference check table 120. O means that the terminal 3002 (refer to FIG. 1) corresponding to the terminal ID (PC2) has received the key data and the terminal ID (=PC1) of the channel CH1.

At step SD3, the CPU 101 decides whether or not there is a large possibility of the occurrence of interference in the terminal ID (=PC2) by referring to the interference check table 120. In this case, the possibility of the occurrence of interference means that there is a possibility of the occurrence of interference between the key data from the radio keyboard 5002 corresponding to the terminal 3002 and the key data from the radio keyboard 5001 corresponding to the other terminal 3001 in the same channel (in this case, the channel CH1), when the current set channel (in this case, the channel CH2) has been changed to the other set channel (in this case, the channel CH1).

Specifically, the CPU 101 decides that there is a large possibility of the occurrence of interference when a channel other than the set channel (=the channel CH2) has been set with O by using the terminal ID (=PC2) as a key in the interference check table 120. In this case, the channel CH1 is set with O. Therefore, the CPU 101 sets "Yes" as a result of the decision made at step SD3.

At step SD4, the CPU 101 transmits data according to the set channel (in this case, the channel CH2) and the interference channel (in this case, the channel CH1) as the interference data to the terminal 3002 via the network 200.

When the terminal 3002 has received the interference data transmitted at step SD4, the CPU 3022 makes an interference notification screen 610 shown in FIG. 11 displayed on the display 4002.

This interference notification screen 610 is a screen for notifying a possibility of the occurrence of interference to a user when the setting of the current set channel (the channel CH2) has been changed to the interference channel (the channel CH1). Accordingly, this user sets other free channel by avoiding the interference channel at the time of changing the setting of the channel.

In this case, for changing the setting of a channel to the above-described free channel, the CPU 3021 requests the high-order channel 100 to transmit the channel-setting data via the network 200, based on an instruction from the user.

Accordingly, the CPU 101 of the high-order terminal 100 sets "Yes" as a result of the decision made at step SD5 shown in FIG. 8. At step SD6, the high-order terminal 100 transmits the channel-setting data of the channel-setting table 110 (refer to FIG. 3) stored in the memory 102 to the terminal 3001 via the network 200.

When the terminal 3001 has received the channel-setting data, the CPU 3021 makes a channel setting confirmation screen 620 shown in FIG. 12 displayed on the display 4001. This channel setting confirmation screen 620 is a screen for displaying the current channel setting in the multi-channel input system, and this screen corresponds to the channel-setting table 110 (refer to FIG. 3).

The user avoids the interference channel (the channel CH2) by referring to the interference notification screen 600 (refer to FIG. 10), and selects a free channel (the channel CH3 or the channel CH4) by referring to the channel setting confirmation screen 620 (refer to FIG. 12).

Next, the user changes the channel setting from the current channel CH1 to the channel CH3, for example, with the channel-setting switch 3061 of the terminal 3001. Similarly, the user changes the channel setting from the current channel CH1 to the channel CH3 with the channel-setting switch 5021 of the radio keyboard 5001. With this arrangement, no interference occurs when the set channel has been changed.

When the changing of the set channel has been completed, the CPU 3021 of the terminal 3001 transmits the alteration data (the channel CH1 before the changing, and the channel CH3 and the PC1 after the changing) to the high-order terminal 100 via the network 200. When the high-order terminal 100 has received this alteration data, the CPU 101 updates the channel-setting table 110 shown in FIG. 3 based on the alteration data. In this case, the channel CH1 becomes "free", and the channel CH3 becomes "PC1".

Figure 9:
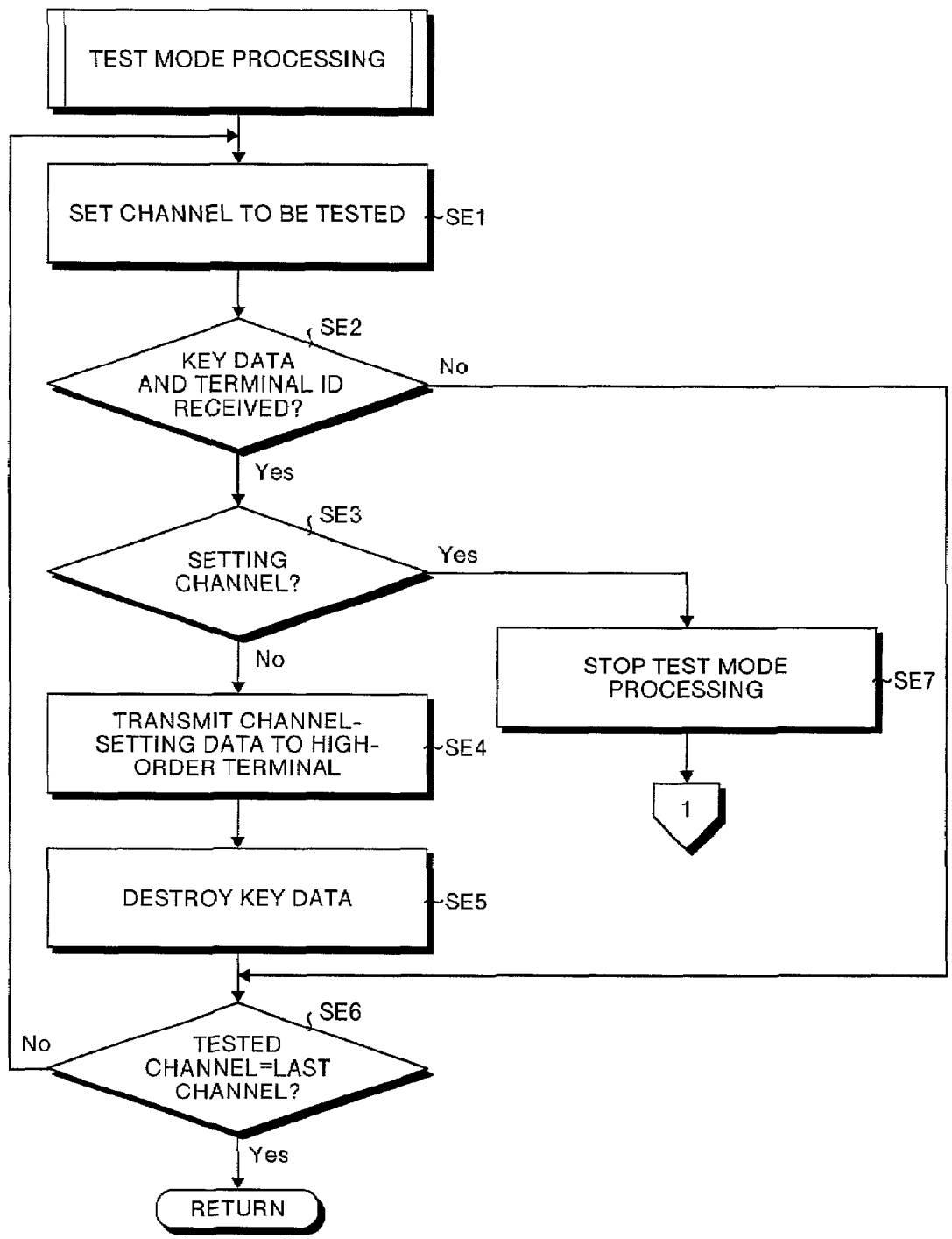
FIG. 9 is a flowchart for explaining another test mode processing in the first embodiment.

In the first embodiment, a separate test mode processing shown in FIG. 9 may be executed in place of the test mode processing shown in FIG. 7. The test mode processing shown in FIG. 9 has characteristics in that the processing is interrupted to execute the normal operation mode processing (refer to FIG. 5) when the key data of a set channel has been received during the scanning of a channel.

A test mode processing will be explained below by taking the terminal 3002 shown in FIG. 1 as an example. When a result of the decision made at step SA2 shown in FIG. 5 has become "Yes", the CPU 3022 of the terminal 3002 scans, at step SA4, the first receiving channel R2_CH1 to the n-th receiving channel R2_CHn shown in FIG. 2, thereby to execute a test mode processing for testing an interference status about which receiving channel has received key data and a terminal ID.

Specifically, at step SE1 shown in FIG. 9, the CPU 3022 sets the first receiving channel R2_CH1 (the channel CH1) to the receiving section 3072 as a channel to be tested. At step SE2, the CPU 3022 decides whether or not the first receiving channel R2_CH1 (the channel CH1) has received the key data and the terminal ID (=PC1) from the radio keyboard 5001.

When the key data and the terminal ID (=PC1) from the radio keyboard 5001 have been received by the first receiving channel R2_CH1 (the channel CH1), the CPU 3022 sets "Yes" as a result of the decision made at step SE2. When a result of the decision made at step SE2 is "No", the CPU 3022 makes decision at step SE6.

At step SE3, the CPU 3022 decides whether or not the tested channel (in this case, the first receiving channel R2_CH1 (the channel CH1)) is the set channel (the second receiving channel R2_CH2 (the channel CH2)) set at step SE1. In this case, the CPU 3022 sets "No" as a result of the decision made.

At step SE4, the CPU 3022 transmits the channel data according to the reception (in this case, the channel CH1) and the terminal ID according to the own terminal (=PC2) to the high-order terminal 100 via the network 200. Thus, the high-order terminal 100 sets "Yes" as a result of the decision made at step SD1 shown in FIG. 8, and executes the above processing.

Referring back to FIG. 9, at step SE5, the CPU 3022 destroys the key data from the radio keyboard 5001 that has been received by the first receiving channel R2_CH1 (the channel CH1). At step SE6, the CPU 3022 decides whether or not the tested channel (in this case, the first receiving channel R2_CH1 (the channel CH1)) is the last channel (the n-th receiving channel R2_CHn (the channel CHn)). In this case, the CPU 3022 sets "No" as a result of the decision made.

At step SE1, the CPU 3022 sets the second receiving channel R2_CH2 (the channel CH2) to the receiving section 3072 as a channel to be tested next. At step SE2, the CPU 3022 decides whether or not the second receiving channel R2_CH2 (the channel CH2) has received the key data and the terminal ID (=PC2) from the radio keyboard 5002.

When the key data and the terminal ID (=PC2) from the radio keyboard 5002 have been received by the second receiving channel R2_CH2 (the channel CH2), the CPU 3022 sets "Yes" as a result of the decision made at step SE2.

At step SE3, the CPU 3022 decides whether or not the tested channel (in this case, the second receiving channel R2_CH2 (the channel CH2)) is the set channel (the second receiving channel R2_CH2 (the channel CH2)) set at step SE1. In this case, the CPU 3022 sets "Yes" as a result of the decision made.

At step SE7, the CPU 3022 stops the test mode processing by interruption, and executes the normal operation mode processing at step SA3 shown in FIG. 3. Specifically, at step SB1 shown in FIG. 6, the CPU 3022 stores the reception time by the receiving section 3072 as the reception time data in the memory 3032, based on the time data from the timer 3052.

At step SB2, the CPU 3022 analyzes the received key data. At step SB3, the CPU 3022 makes the information like a text displayed on the display 4002, based on a result of the analysis at step SB2.

As explained above, according to the first embodiment, a setting status of each channel in a multi-channel input system is managed based on the channel-setting table 110 (refer to FIG. 3). Channel-setting data is displayed on the display (refer to FIG. 12) of any one of the terminals 3001 to 300n according to a request from this terminal. Therefore, it is possible to avoid such a situation that a channel that is the same as the channel of a certain terminal is set to other separate terminal. As a result, it is possible to avoid the occurrence of interference.

According to the first embodiment, when a channel other than a set channel has a data reception during a period while the set channel at a terminal has no data reception, this channel is set as a candidate interference channel that has a possibility of the occurrence of interference at the time of updating the set channel, as explained with reference to FIG. 7. Then, this candidate interference channel is displayed on the display of the terminal (FIG. 10 and FIG. 11). Therefore, by setting a channel other than the interference channel at the time of updating the set channel at this terminal, it is possible to prevent interference following the updating of the set channel.

Furthermore, key data received during a test mode processing is destroyed, as explained with reference to FIG. 7. Therefore, it is possible to avoid affecting the data processing at the terminal.

Moreover, when a set channel has received data during a test mode processing, the processing is interrupted to execute the normal operation mode processing, as explained with reference to FIG. 9. Therefore, it is possible to avoid affecting the intrinsic data processing of the set channel.

In the first embodiment, explanation has been given about the case where a channel setting is carried out manually for both terminals and radio keyboards. It is also possible to automatically set channels according to a free status of channels. This case will be explained below as a second embodiment.

Figure 13:
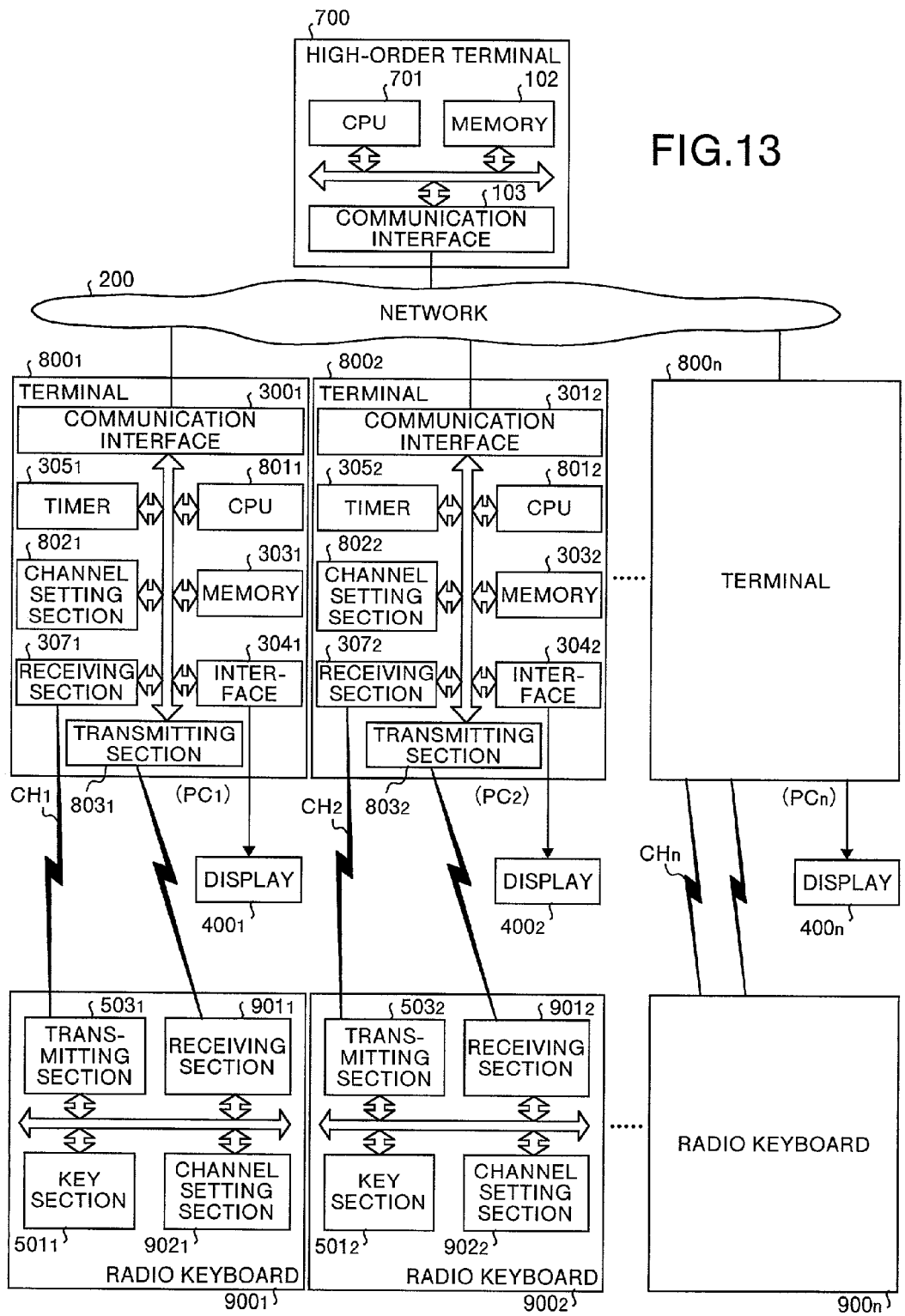
FIG. 13 is a block diagram showing a structure of the second embodiment of the present invention.

FIG. 13 is a block diagram showing a structure of the second embodiment of the present invention. In this drawing, portions corresponding to those shown in FIG. 1 are attached with like reference numbers. In FIG. 13, a multi-channel input system is constructed of a high-order terminal 700 for managing the setting of channels CH1 to CHn (refer to FIG. 2) and catching a channel interference status, n terminals 8001 to 800n that are connected to the high-order terminal 700 via a network 200, displays 4001 to 400n that are connected to these terminals 8001 to 800n respectively, and n radio keyboards 9001 to 900n corresponding to the terminals 8001 to 800n respectively.

The high-order terminal 700 is a personal computer for managing the setting of the channels CH1 to CHn and catching a channel interference status. The high-order terminal 700 can communicate with the terminals 8001 to 800n via the network 200. In this high-order terminal 700, a CPU 701 executes the management of the setting of the channels. The operation of the CPU 701 will be explained in detail later with reference to a flowchart.

A memory 102 stores a channel-setting table 110 (refer to FIG. 20A) and an interference check table 120 (refer to FIG. 4). In the channel-setting table 110 shown in FIG. 20A, the channel CH1 and the channels CH3 to CHn are set to the terminal 8001 (the radio keyboard 9001) and the terminal 8003 (the radio keyboard 9003) to the terminal 800n (the radio keyboard 900n) corresponding to the terminal IDs of PC1 and PC32 to PCn respectively. On the other hand, the channel CH2 is not set to any terminal, and this is a free channel.

Referring back to FIG. 13, the terminals 8001 to 800n (however, the terminal 8002 is not used) are connected to the radio keyboards 9001 to 900n (however, the radio keyboard 9002 is not used), by utilizing the channels CH1 to CHn (however, the channel CH2 is a free channel), via the radio links.

At the terminal 8001, a CPU 8011 is for controlling each section, and this CPU executes the control of channel setting in addition to the catching of an interference status and execution of various kinds of processing. The operation of this CPU 8011 will be explained in detail later.

A channel setting section 8021 has a function of automatically setting any one of the channels CH1 to CHn to a receiving section 3071 according to the control of the CPU 8011. In the example shown in FIG. 13, the channel CH1 has been set to the receiving section 3071 by the channel setting section 8021. A transmitting section 8031 transmits setting-channel data and a terminal ID to be described later to the radio keyboard 9001 via a radio link.

The radio keyboard 9001 is connected to the terminal 8001 via the radio link. In the radio keyboard 9001, the receiving section 9011 receives setting-channel data and a terminal ID from the transmitting section 8031 of the terminal 8001.

The channel setting section 9021 automatically sets one channel (the same channel as that set to the receiving section 3071) to the transmitting section 5031 out of the channels CH1 to CHn based on the setting-channel data and the terminal ID. In the example shown in this drawing, the channel setting section 9021 has set the channel CH1 to the transmitting section 5031.

At the terminal 8002, a CPU 8012 is for controlling each section, and this CPU executes the control of channel setting in addition to the catching of an interference status and execution of various kinds of processing. The operation of this CPU 8012 will be explained in detail later.

A channel setting section 8022 has a function of automatically setting any one of the channels CH1 to CHn to a receiving section 3072 according to the control of the CPU 8012. However, it is assumed that no channel has been set to the receiving section 3072 at present. A transmitting section 8032 transmits setting-channel data and a terminal ID to be described later to the radio keyboard 9002 via a radio link.

The radio keyboard 9002 is connected to the terminal 8002 via the radio link when a channel has been set. However, as no channel has been set at present, the radio keyboard 9002 is not connected to the terminal 8002. In the radio keyboard 9002, the receiving section 9012 receives setting-channel data and a terminal ID from the transmitting section 8032 of the terminal 8002.

The channel setting section 9022 sets one channel (the same channel as that set to the receiving section 3072) to the transmitting section 5032 out of the channels CH1 to CHn based on the setting-channel data and the terminal ID.

Referring back to FIG. 13, the terminal 800$n$ has the same structure as that of the terminal 8001. The radio keyboard 900$n$ has the same structure as that of the radio keyboard 9001, and is connected to the terminal 800$n$ via the radio link (the channel CH$n$).

Figure 14:
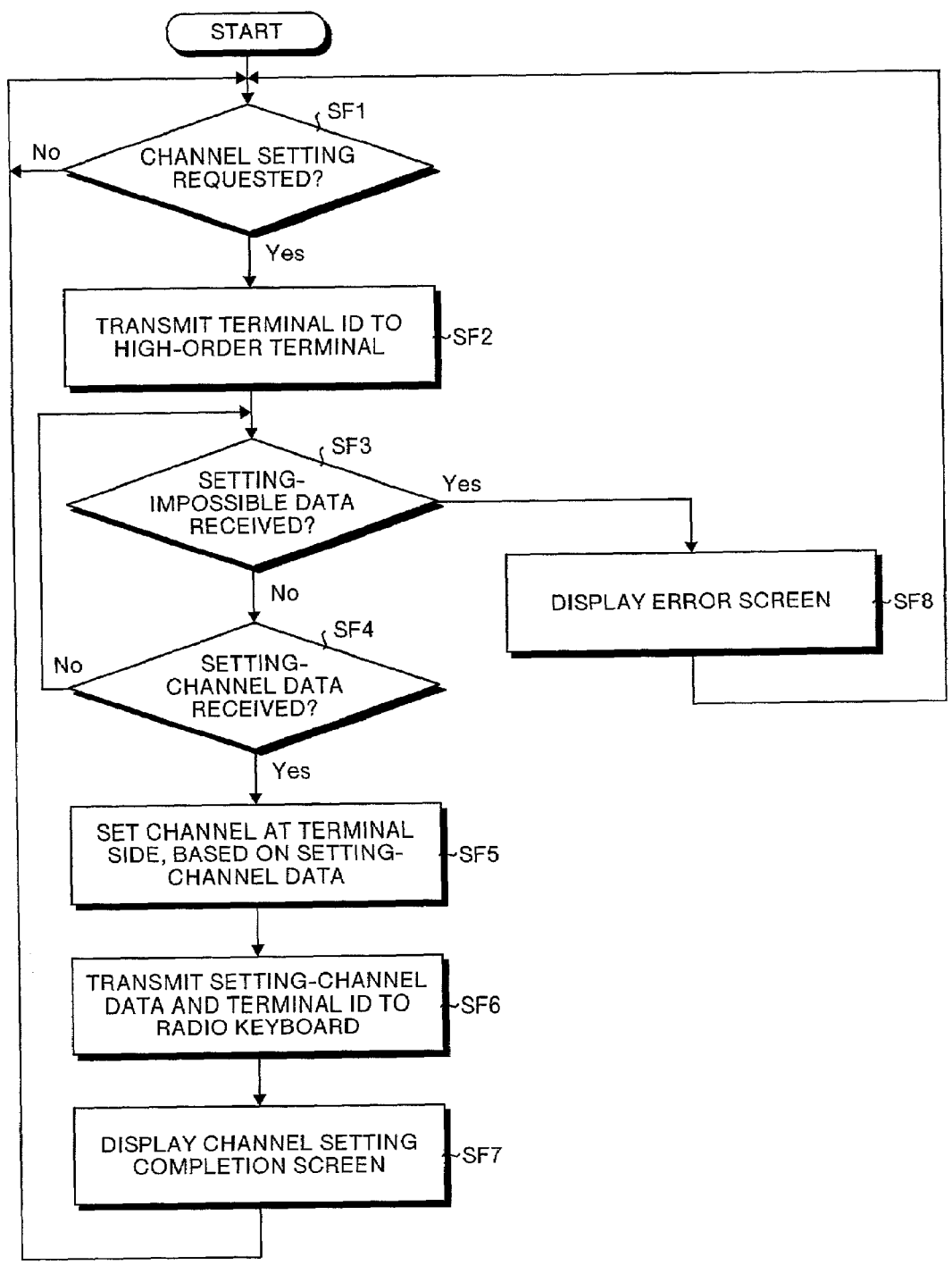
FIG. 14 is a flowchart for explaining the operation of terminals 8001 to 800n shown in FIG. 13.

Next, the operation of the second embodiment will be explained in detail with reference to FIG. 14 to FIG. 20. FIG. 14 is a flowchart for explaining the operation of the terminals 8001 to 800$n$ shown in FIG. 13.

Figure 15:
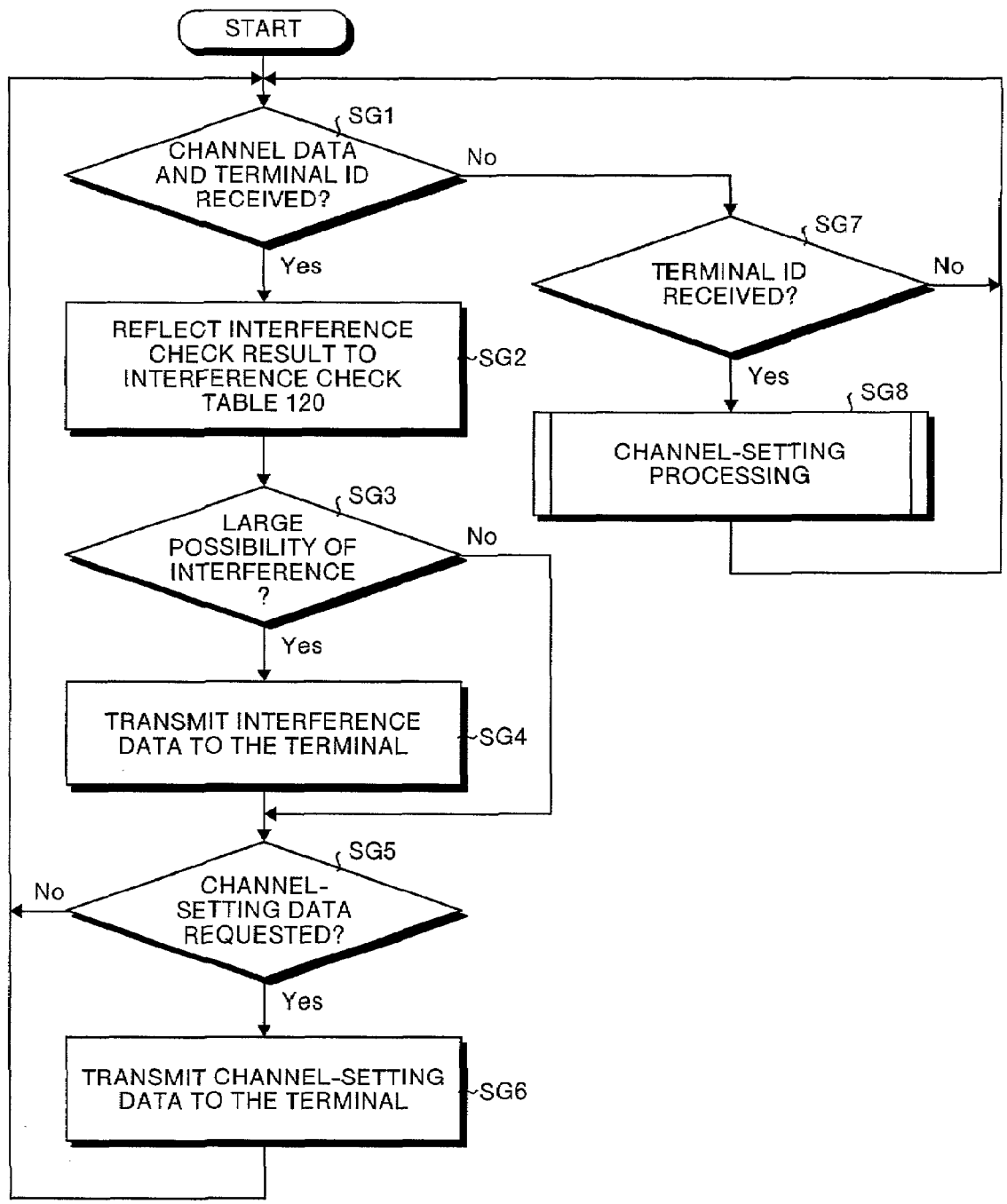
FIG. 15 is a flowchart for explaining the operation of a high-order terminal 700 shown in FIG. 13.
Figure 16:
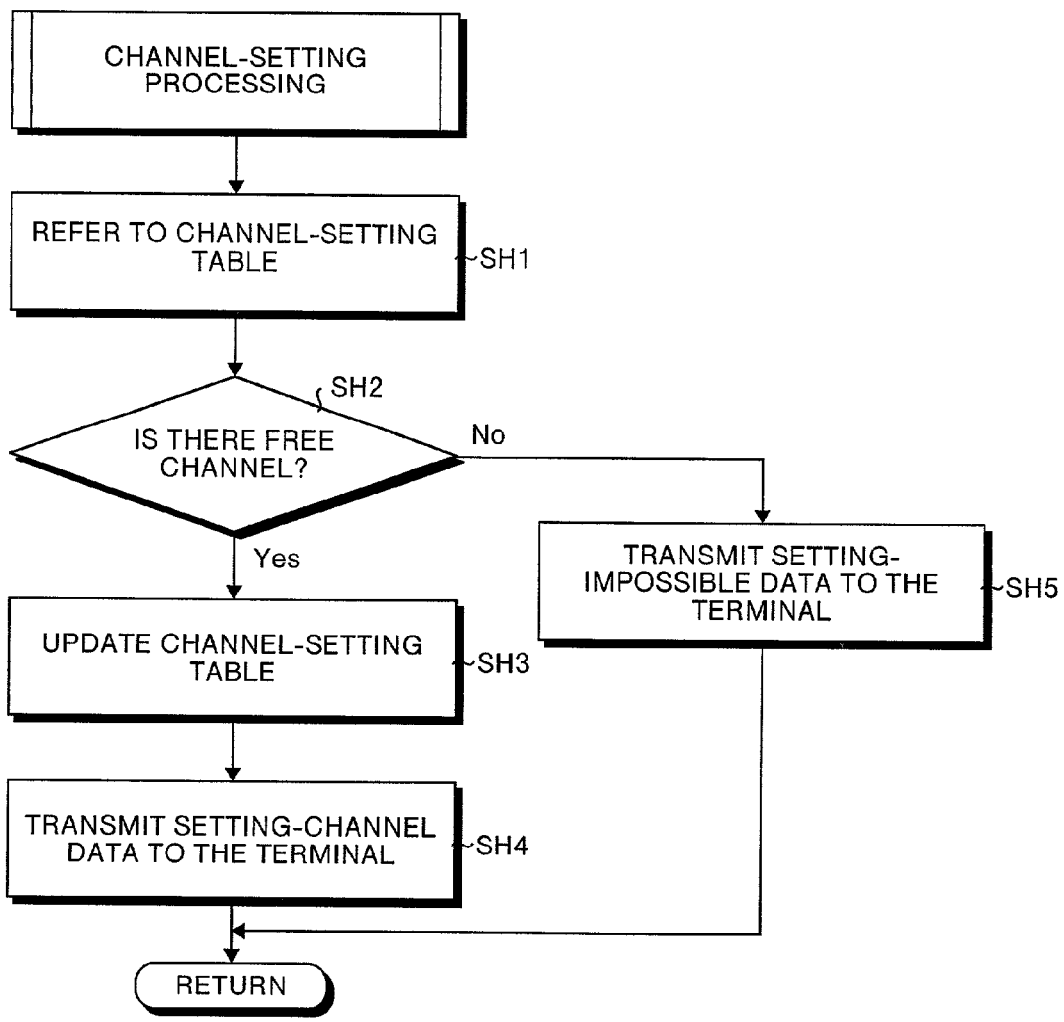
FIG. 16 is a flowchart for explaining a channel-setting processing shown in FIG. 15.
Figure 17:
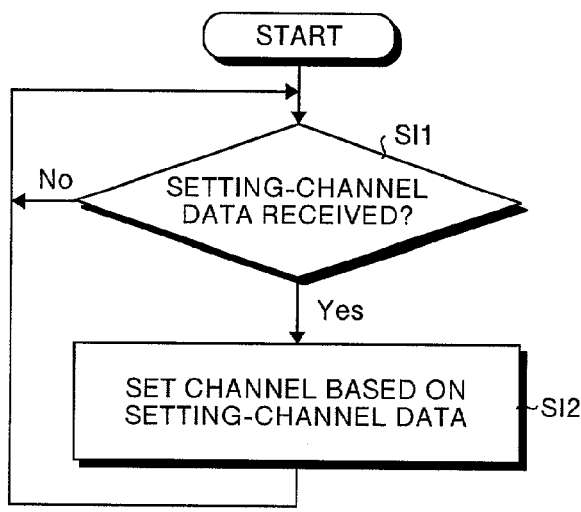
FIG. 17 is a flowchart for explaining the operation of radio keyboards 9001 to 900n shown in FIG. 13.

FIG. 15 is a flowchart for explaining the operation of the high-order terminal 700 shown in FIG. 13. FIG. 16 is a flowchart for explaining a channel-setting processing shown in FIG. 15. FIG. 17 is a flowchart for explaining the operation of the radio keyboards 9001 to 900$n$ shown in FIG. 13.

Explanation will be given below about a case of automatically setting channels to the terminal 8002 and the radio keyboard 9002 shown in FIG. 13. Accordingly, at present, no channel has been set to the terminal 8002 and the radio keyboard 9002.

In this status, at step SF1 shown in FIG. 14, the CPU 8012 of the terminal 8002 decides whether or not there has been a channel setting request from a user. In this case, the CPU 8012 sets "No" as a result of the decision made. The CPU 8012 repeats making a decision. This channel setting request is a request for automatically setting a channel to the terminal 8002 and the radio keyboard 9002. The operation of a DIP switch not shown triggers to produce an output.

At step SG1 in FIG. 15, the CPU 701 of the high-order terminal 700 decides whether or not channel data and a terminal ID have been received from any one of the terminals 8001 to 800$n$, in a similar manner to that at step SD1 (refer to FIG. 8). In this case, the CPU 701 sets "No" as a result of the decision made.

When a result of the decision made at step SG1 is "Yes", the CPU 701 executes the processing at step SG3 to step SG6 in a similar manner to that at step SD2 to step SD6 (refer to FIG. 8).

At step SG7, the CPU 701 decides whether or not a terminal ID as the above channel setting request has been received from any one of the terminals 8001 to 800$n$. In this case, the CPU 701 sets "No" as a result of the decision made. Thereafter, the CPU 701 repeats making a decision of step SG1 and SG7 until when a result of the decision made at step SG1 becomes "Yes" or until when a result of the decision made at step SG7 becomes "Yes".

At step SI1 shown in FIG. 17, the channel setting section 9022 of the radio keyboard 9002 decides whether or not setting-channel data has been received. In this case, the channel setting section 9022 sets "No" as a result of the decision made. Thereafter, the channel setting section 9022 repeats making a decision in a similar manner. This setting-channel data is data according to a channel that is to be set to the transmitting section 5032.

When there has been the channel setting request from the user of the terminal 8002, the CPU 8012 sets "Yes" as a result of the decision made at step SF1 shown in FIG. 14. At step SF2, the CPU 8012 transmits the terminal ID (=PC2) as the channel setting request, to the high-order terminal 700 via the network 200.

At step SF3, the CPU 8012 decides whether or not setting-impossible data has been received from the high-order terminal 700. In this case, the CPU 8012 sets "No" as a result of the decision made. This setting-impossible data is data that shows it is not possible to set a channel to this terminal, as there is no free channel.

At step SF4, the CPU 8012 decides whether or not setting-channel data has been received from the high-order terminal 700. This setting-channel data is data according to a free channel that can be set to this terminal. In this case, the CPU 8012 sets "No" as a result of the decision made at step SF4. Thereafter, the CPU 8012 repeats making a decision of step SF3 and SF4 until when a result of the decision made at step SF3 becomes "Yes" or until when a result of the decision made at step SF4 becomes "Yes".

When the high-order terminal 700 has received the terminal ID (=PC2) transmitted from the terminal 8002 at step SF2, the CPU 701 of the high-order terminal 700 sets "Yes" as a result of the decision made at step SG7 shown in FIG. 15. At step SG8, the CPU 701 executes a channel-setting processing for setting a channel to the terminal (in this case, the terminal 8002) that corresponds to the received terminal ID (=PC2).

Figures 20A, 20B, 21:
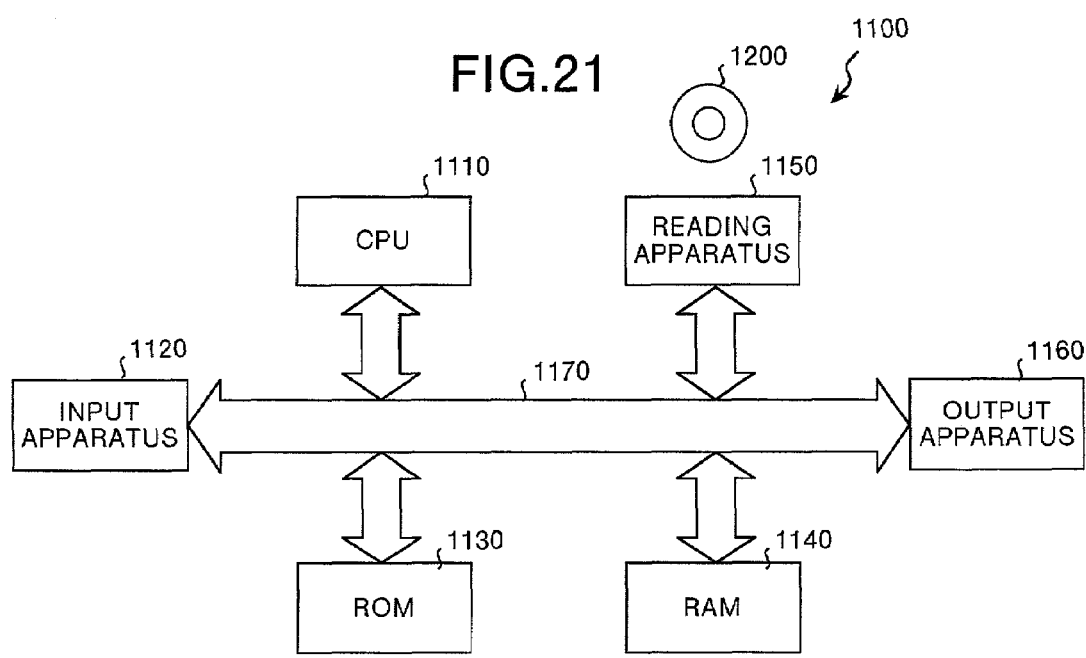
FIG. 20A and FIG. 20B are diagrams for explaining the updating of a channel-setting table 110 in the second embodiment.
FIG. 21 is a diagram showing a structure of a modification of the first and second embodiments.
Figure 22:
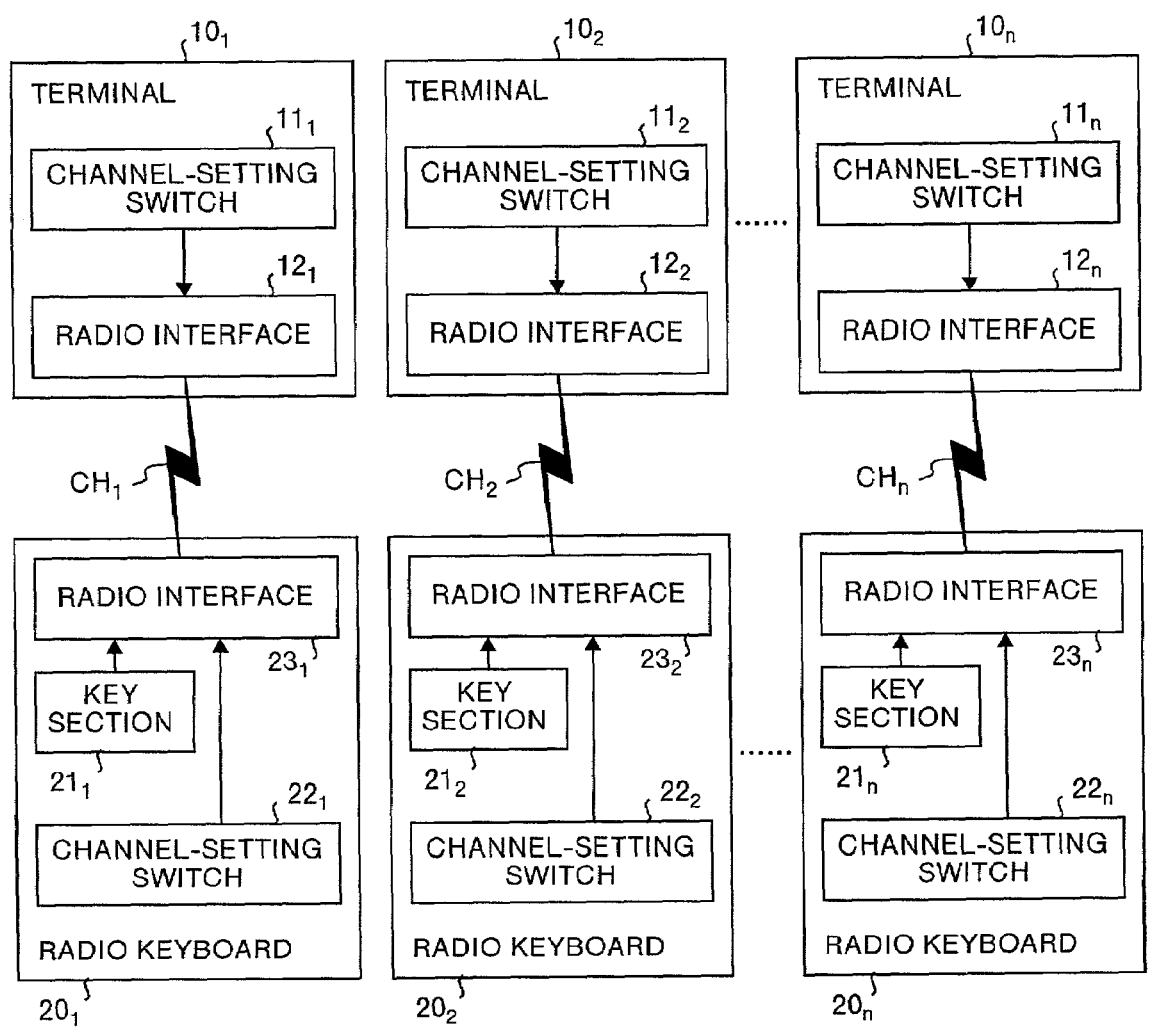
FIG. 22 is a block diagram showing a structure of a conventional multi-channel input system.

Specifically, at step SH1 shown in FIG. 16, the CPU 701 refers to the channel-setting table 110 shown in FIG. 20A. At step SH2, the CPU 701 decides whether or not there is a "free" channel in the channel-setting table 110. In this case, the CPU 701 sets "Yes" as a result of the decision made at step SH2, as the channel CH2 is free.

At step SH3, the CPU 701 sets PC2 as the terminal ID to the channel CH2, as shown in FIG. 20B, thereby to update the channel-setting table 110. At step SH4, the CPU 701 transmits the setting-channel data (=the channel CH2) to the terminal 8002 via the network 200.

When the terminal 8002 has received the setting-channel data (=the channel CH2) transmitted at step SH4, the CPU 8012 of the terminal 8002 sets "Yes" as a result of the decision made at step SF4 shown in FIG. 14.

At step SF5, the CPU 8012 delivers the setting-channel data (=the channel CH2) to the channel setting section 8022, thereby to set the channel to the terminal 8002. In other words, the channel setting section 8022 sets the channel CH2 to the receiving section 3072.

At step SF6, the CPU 8012 transmits the setting-channel data (=the channel CH2) and the terminal ID (=PC2) to the radio keyboard 9002 via the transmitting section 8032. At step SF7, the CPU 8012 makes a channel setting completion screen 1000 shown in FIG. 18 displayed on the display 4002. This channel setting completion screen 1000 is a screen for notifying the completion of the setting of the channel CH2 to the user.

When the setting-channel data (=the channel CH2) and the terminal ID (=PC2) transmitted at step SF6 have been received by the receiving section 9012 of the radio keyboard 9002, the channel setting section 9021 sets "Yes" as a result of the decision made at step SI1 shown in FIG. 17.

At step SI2, the channel setting section 9021 sets the channel CH2 to the transmitting section 5032 based on the setting-channel data (=the channel CH2). As a result, the channel setting to the terminal 8002 and the radio keyboard 9002 corresponding to this terminal has been completed.

On the other hand, when a result of the decision made at step SH2 shown in FIG. 16 is "No", that is, when there is no free channel in the channel-setting table 110, the CPU 701 of the high-order terminal 700 transmits setting-impossible data to the terminal 8002 at step SH5.

When the terminal 8002 has received the setting-impossible data, the CPU 8012 of the terminal 8002 sets "Yes" as a result of the decision made at step SF3 shown in FIG. 14. At step SF8, the CPU 8012 makes an error screen 1010 shown in FIG. 19 displayed on the display 4002. This error screen 1010 is a screen for notifying the user that it is not possible to set a channel to the terminal 8002 and the radio keyboard 9002, as there is no free channel.

As explained above, according to the second embodiment, a free channel is found based on the channel-setting table 110 shown in FIG. 20A that shows the setting status of each channel in the multi-channel input system. This free channel is set to between a terminal that requires the setting of a channel and a radio keyboard corresponding to this terminal. Therefore, it is possible to set channels quickly and accurately.

While the two embodiments according to the present invention have been explained above with reference to the drawings, detailed structure examples are not limited to these first and second embodiments. Any design alterations within a range not deviating from the gist of the present invention are all included in the present invention.

For example, in the first and second embodiments, it may be arranged as follows. That is, a program for realizing the functions of achieving the channel management, the channel setting, and the interference channel management is recorded on a computer-readable recording medium 1200 as shown in FIG. 21. Then, a computer 1100 shown in this drawing reads the program recorded on this recording medium 1200, and executes this program, thereby to realize the above functions.

The computer 1100 is composed of a CPU 1110 for executing the above program, an input apparatus 1120 like a keyboard and a mouse, a ROM (Read-only Memory) 1130 for storing various kinds of data, a RAM (Random Access Memory) 1140 for storing operation parameters and the like, a reading apparatus 1150 for reading the program from the recording medium 1200, an output apparatus 1160 like a display and a printer, and a bus 1170 for connecting between these units.

The CPU 1110 reads the program stored in the recording medium 1200 via the reading apparatus 1150, and executes the program, thereby to realize the above functions. The recording medium 1200 includes not only a portable recording medium like an optical disk, a floppy disk, and a hard disk, but also a transmission medium for temporarily holding data like a network.

Further, in the first embodiment, the function of the high-order terminal 100 (refer to FIG. 1) may be held in any one of the terminals 3001 to 300n. Similarly, in the second embodiment, the function of the high-order terminal 700 (refer to FIG. 13) may be held in any one of the terminals 8001 to 800n.

While it is explained that the radio keyboard is an input apparatus in the first and second embodiments, the input apparatus is not limited to the radio keyboard. When the multi-channel system is used, any kind of input apparatus (for example, a mouse) is also included in the present invention.

As explained above, according to the present invention, a setting status of each channel in a multi-channel input system is managed, and the setting status is notified to each terminal according to a request from the terminal. Therefore, it is possible to avoid such a situation that a channel that is the same as the channel of a certain terminal is set to other separate terminal. As a result, there is an effect that it is possible to avoid the occurrence of interference.

Furthermore, when a channel other than a set channel has a data reception during a period while the set channel has no data reception, this channel is set as a candidate interference channel that has a possibility of the occurrence of interference at the time of updating the set channel. Therefore, there is an effect that, by setting a channel other than the interference channel at the time of updating the set channel at this terminal, it is possible to prevent interference following the updating of the set channel.

Moreover, a free channel is found based on the setting status of each channel in the multi-channel input system, and this free channel is set to between a terminal that requires the setting of a channel and an input apparatus corresponding to this terminal. Therefore, there is an effect that it is possible to set channels quickly and accurately.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A multi-channel management apparatus, which is connected to a plurality of terminals via a network and independently communicates with each of the terminals and is applied to a multi-channel input system for making cordless connection between the plurality of terminals and a plurality of input apparatuses corresponding to these terminals based on a multi-channel system, the multi-channel management apparatus comprising:

a management unit which manages a setting status of each channel in the multi-channel input system by providing a channel-setting table showing a relationship between the plurality of terminals and a plurality of channels that can be utilized in the multi-channel input system; and a notification unit which notifies the setting status to a particular one of the terminals according to a request from the particular terminal, wherein the multi-channel management apparatus further comprises an interference channel candidate extraction unit, which selects a channel as a candidate interference channel having a possibility of the occurrence of interference at the time of updating a set channel, and notifies the interference channel to a terminal, when this channel other than the set channel has a data reception during a period while the set channel set at the terminal has no data reception.

2. A multi-channel management method that is applied to a multi-channel input system for making cordless connection between a plurality of terminals each connected to and independently communicating with a high-order terminal via a network and a plurality of input apparatuses corresponding to these terminals based on a multi-channel system, the multi-channel management method comprising:

managing a setting status of each channel in the multi-channel input system by providing a channel-setting table in the high-order terminal;

notifying the setting status to a particular one of the terminals according to a request from the particular terminal;

extracting an interference channel candidate for selecting a channel as a candidate interference channel having a possibility of the occurrence of interference at the time of updating a set channel; and notifying the interference channel to a terminal, when this channel other than the set channel has a data reception during a period while the set channel set at the terminal has no data reception.

3. A computer program containing instructions which when executed on a computer causes the computer to function as:
  a management unit which manages a selling status of each channel in a multi-channel input system by providing a channel-setting table provided in a high-order terminal for making cordless connection between a plurality of terminals each connected to and independently communicating with the high-order terminal via a network and a plurality of input apparatuses corresponding to these terminals based on a multi-channel system;
  a notification unit which notifies the setting status to a particular one of the terminals according to a request from the particular terminal; and
  an interference channel candidate extraction unit which selects a channel as a candidate interference channel having a possibility of the occurrence of interference at the time of updating a set channel, and notifies the interference channel to a terminal, when this channel other than the set channel has a data reception during a period while the set channel set at the terminal has no data reception.

4. A multi-channel terminal connected to and communicating with a high-order terminal via a network, which manages a setting status of each channel in a multi-channel input system, wherein the multi-channel terminal is in cordless connection to an input apparatus by utilizing a set channel that has been set in advance out of a plurality of channels based on a multi-channel system, the multi-channel terminal comprising:
  a checking unit which checks presence or absence of a data reception in a channel other than a set channel during a period while the set channel has no data reception;
  an interference channel candidate extraction unit which selects a channel as a candidate interference channel having a possibility of the occurrence of interference at the time of updating the set channel, when the checking unit has detected a data reception; and
  a notification unit which notifies the candidate interference channel and a setting status of each channel of the multi-channel system to a user.

5. The multi-channel terminal according to claim 4, further comprising an interruption processing unit which interrupts a processing to execute a processing of received data, when a set channel has received data while the checking unit is checking.

6. The multi-channel terminal according to claim 4, wherein the checking unit destroys data that has been received during the checking.

7. A multi-channel interference management method applied to a multi-channel terminal, which is connected to and communicates with a high-order terminal via a network and is in cordless connection to an input apparatus by utilizing a set channel that has been set in advance out of a plurality of channels based on a multi-channel system, the multi-channel interference management method comprising:
  checking presence or absence of a data reception in a channel other than a set channel during a period while the set channel has no data reception;
  when it is decided in the checking process that there is data reception, selecting a channel as a candidate interference channel having a possibility of the occurrence of interference at the time of updating the set channel; and
  notifying the candidate interference channel and a setting status of each channel of the multi-channel system to a user.

8. A computer program containing instructions which when executed on a computer causes the computer to function as:
  a checking unit which checks presence or absence of a data reception in a channel other than a set channel during a period while the set channel set in advance out of a plurality of channels has no data reception, at a multi-channel terminal, which is connected to and communicates with a high-order terminal via a network and is utilized for making cordless connection to an input apparatus based on a multi-channel system;
  an interference channel candidate extraction unit which selects a channel as a candidate interference channel having a possibility of the occurrence of interference at the time of updating the set channel, when the checking unit has detected a data reception; and
  a notification unit which notifies the candidate interference channel and a setting status of each channel of the multi-channel system to a user.

* * * * *